(12) United States Patent
Nilsson et al.

(10) Patent No.: US 11,184,901 B2
(45) Date of Patent: Nov. 23, 2021

(54) BEAM MANAGEMENT

(71) Applicant: Telefonaktiebolaget LM Ericsson (publ), Stockholm (SE)

(72) Inventors: Andreas Nilsson, Gothenburg (SE); Sebastian Faxér, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 147 days.

(21) Appl. No.: 16/720,143

(22) Filed: Dec. 19, 2019

(65) Prior Publication Data

US 2021/0195605 A1    Jun. 24, 2021

(51) Int. Cl.
| | |
|---|---|
| H04L 12/26 | (2006.01) |
| H04W 72/08 | (2009.01) |
| H04L 5/00 | (2006.01) |
| H04W 72/02 | (2009.01) |
| H04W 72/04 | (2009.01) |

(52) U.S. Cl.
CPC ......... *H04W 72/085* (2013.01); *H04L 5/0051* (2013.01); *H04W 72/02* (2013.01); *H04W 72/044* (2013.01)

(58) Field of Classification Search
None
See application file for complete search history.

(56) References Cited

U.S. PATENT DOCUMENTS

| | | | | |
|---|---|---|---|---|
| 2015/0139003 A1* | 5/2015 | Takahashi | ............. | H04W 24/10 370/252 |
| 2017/0064576 A1* | 3/2017 | Kusashima | ........... | H04W 48/16 |
| 2017/0078903 A1* | 3/2017 | Kusashima | ........... | H04W 52/02 |

(Continued)

FOREIGN PATENT DOCUMENTS

| | | |
|---|---|---|
| CN | 108924855 A | 11/2018 |
| EP | 3 242 509 A1 | 11/2017 |
| EP | 3 535 856 A1 | 9/2019 |

OTHER PUBLICATIONS

3GPP TS 38.331 V15.6.0 (Jun. 2019); 3rd Generation Partnership Project; Technical Specification Group Radio Access Network; NR; Radio Resource Control (RRC) protocol specification; (Release 15) (Jun. 2019). (519 pages).

(Continued)

*Primary Examiner* — Phirin Sam
(74) *Attorney, Agent, or Firm* — Rothwell, Figg, Ernst & Manbeck, P.C.

(57) ABSTRACT

An exemplary method provides for a user equipment (UE) receiving a first reference signal (RS) that was transmitted by a base station using a first transmit beam. The UE performs a first RS measurement with respect to the received first RS, producing a first measurement result. The UE receives a second RS that was transmitted by the base station using the first transmit beam. The UE performs a second RS measurement with respect to the received second RS, producing a second measurement result. The UE determines that a condition is satisfied based on determining that the base station has transmitted to the UE a measurement result filtering indicator indicating that the UE may filter its first and second measurement results. The UE derives a filtered measurement result based on the first measurement result and the second measurement result, and selects a beam based on the filtered measurement result.

20 Claims, 17 Drawing Sheets

(56) References Cited

U.S. PATENT DOCUMENTS

| | | | |
|---|---|---|---|
| 2017/0164377 A1* | 6/2017 | Ho | H04W 16/28 |
| 2018/0242336 A1 | 8/2018 | Frenne et al. | |
| 2019/0335477 A1* | 10/2019 | Nam | H04B 7/088 |
| 2019/0393970 A1* | 12/2019 | Kumar | H04W 4/02 |
| 2020/0077286 A1* | 3/2020 | Liu | H04W 8/02 |
| 2020/0304195 A1* | 9/2020 | Wang | H04B 7/088 |

OTHER PUBLICATIONS

International Search Report and Written Opinion issued in International Application No. PCT/EP2020/080592 dated Dec. 22, 2020 (62 pages).

* cited by examiner

1500

```
┌─────────────────────────────────────────────────────────────┐
│ As part of a first beam management procedure, using a first │ s1502
│ transmit beam to transmit to a user equipment a first       │
│ reference signal, thereby enabling the UE to produce a      │
│ first measurement result associated with the first          │
│ transmit beam                                               │
└─────────────────────────────────────────────────────────────┘
                              │
                              ▼                                  s1504
┌─────────────────────────────────────────────────────────────┐
│ Triggering a second beam management procedure, wherein      │
│ triggering the second beam management procedure comprises   │
│ transmitting to the UE a triggering message comprising a    │
│ measurement result filtering indicator (MRFI) indicating    │
│ that the UE may produce a filtered measurement result       │
└─────────────────────────────────────────────────────────────┘
                              │
                              ▼                                  s1506
┌─────────────────────────────────────────────────────────────┐
│ As part of the second beam management procedure, using the  │
│ first transmit beam to transmit to the UE a second          │
│ reference signal, thereby enabling the UE to produce the    │
│ second measurement result                                   │
└─────────────────────────────────────────────────────────────┘
                              │
                              ▼                                  s1508
┌─────────────────────────────────────────────────────────────┐
│ As part of the second beam management procedure, receiving  │
│ a beam report transmitted by the UE, the beam report        │
│ comprising a resource indicator selected by the UE using    │
│ the filtered measurement result                             │
└─────────────────────────────────────────────────────────────┘
```

FIG. 15

BEAM MANAGEMENT

TECHNICAL FIELD

Disclosed are embodiments related to beam management.

BACKGROUND

1. Beam Management

Narrow beam transmission and reception schemes are needed at higher frequencies to compensate for high propagation loss. A suitable transmission and reception point (TRP) (e.g., a base station or a component of a base station) transmit (TX) beam for each UE is expected to be discovered and monitored by the network (e.g., by a base station) using measurements on downlink reference signals (RSs) used for beam management. Such downlink reference signals include Channel State Information RSs (CSI-RSs) and synchronization signal blocks (SSBs). Beam management RSs can be transmitted periodically, semi-persistently or aperiodically (event triggered), and they can be either shared between multiple UEs or be UE-specific. The SSB are transmitted periodically and are shared for all UEs. In order to find a suitable TRP TX beam, the TRP transmits CSI-RS/SSB using different TRP TX beams and the UE performs RSRP measurements on the received reference signals and reports back the N best TRP TX beams and their corresponding RSRP values (where N can be configured by the network).

Typically, a base station makes use of three different beam management procedures. These three procedure are knows as: the P1 procedure, the P2 procedure, and the P3 procedure, and are illustrated in FIG. 1, FIG. 2A, and FIG. 2B, respectively. The P1, P2, and P3 procedures are also known as the P1 beam sweep, P2 beam sweep, and P3 beam sweep, respectively.

In the P1 procedure shown in FIG. 1, a base station 102 uses TX beams having large beamwidths. Beam reference signals transmitted using the TX beams are transmitted periodically and are shared between multiple UEs (including UE 104). Examples of the periodic beam reference signals are periodic CSI-RS and SSB. After UE 104 receives the reference signals, UE 104 may report to base station 102 the N best TRP TX beams and their corresponding RSRP values. The beam reporting from UE 104 to base station 102 can be performed in a periodic manner, a semi-persistent manner, or in aperiodic manner. The P1 procedure may be used to find a coarse direction of a UE 104 with respect to base station 102.

After determining the coarse direction of UE 104, in the P2 procedure shown in FIG. 2A, base station 102 uses narrower TRP TX beams covering the area corresponding to the TRP TX beam selected as a result of performing the P1 procedure. In the P2 procedure, base station 102 may transmit reference signals in aperiodic or semi-persistent manner. The P2 procedure may be performed more frequently than the P1 procedure to track UE 104's movements or changes in the radio environment. The P2 procedure may be used to select a suitable narrow TRP TX beam for use in communicating with UE 104.

More specifically, during the P2 beam sweep, UE 104 measures RSRP for each of the beams in the set of TRP beams 203 (using a fixed UE RX beam 101) and sends back to the base station 102 at least one CSI-RS resource indicator (CRI) (also known as CSI-RS resource index), which CRI corresponds to the highest RSRP, and where the CRI corresponds to one of the TRP TX beams 203. During such P2 beam sweep, it is expected that UE 104 will apply a wide beam 101 (a.k.a., a non-directional beam or omni-directional beam) (e.g. the widest beam that the UE is able to generate) so that as many propagation paths as possible between the base station 102 and the UE 104 are captured by the P2 beam sweep.

The P3 procedure is a procedure that enables UE 104 to select a "best" UE receive (RX) beam. For example, after finding a suitable narrow TRP TX beam as a result of performing a P2 beam sweep, in the P3 procedure shown in FIG. 2B, base station 102 transmits a burst of reference signals using one narrow beam 207 (e.g., the narrow TRP TX beam selected as a result of the P2 procedure) in aperiodic or semi-persistent manner. The UE 104 uses different receiving (RX) beams 205 to receive signal(s) from base station 102 to find a suitable RX beam at UE 104. That is, UE 104 can sweep through different UE RX directional beams 205, perform measurements on the CSI-RS and select a preferred UE RX directional beam (e.g., UE RX beam 214). How the UE determine the candidate UE RX beams is up to UE implementation. The P3 procedure may be performed frequently to compensate for blocking and/or UE rotation.

FIG. 3 illustrates an example of beam sets including narrow beams (NB1, NB2, . . . ) and wide beams (WB1, WB2, . . . ). The wide beams may be used in the P1 procedure described above to find a coarse direction of UE 104 with respect to base station 102. The narrow beams may be used in the P2 procedure to find a narrow TX beam that is suitable for data transmission to UE 104.

One way of selecting narrow beams in the P2 procedure is determining which of the wide beams used in the P1 procedure performs the best in terms of RSRP values and selecting narrow beams that are confined within the angular coverage of the determined wide beam. For example, in the exemplary P1 procedure shown in FIG. 1, wide beam 109 was the best wide beam. Thus, in P2 procedure shown in FIG. 2A, the narrow beams confined within angular coverage of the wide beam 109 are selected.

2. mmWave Antenna Implementation

There are three different implementations of beamforming at a TRP—analog beamforming, digital beamforming, and hybrid beamforming. Digital beamforming is the most flexible solution among the three but costs the most due to a large number of required radios and baseband chains. Analog beamforming is cheaper to manufacture as compared to the digital beamforming due to a reduced number of radios and baseband chains. Analog beamforming is the least flexible solution among the three, but is cheaper to implement due to reduced number of radio and baseband chains. Another drawback of the analog beamforming is that a TRP can only transmit or receive in one beam at a time (assuming one panel, and the same beam for both polarizations, which typically is the case in order to counteract dropped signal strength due to polarization mis-matching). Hybrid beamforming is a compromise between the analog beamforming and digital beamforming. One type of beamforming antenna architecture that has been agreed to study in 3GPP for the NR access technology is the concept of antenna panels, both at the TRP and at the UE. A panel is an antenna array of single-polarized or dual-polarized antenna elements with typically one transmit/receive unit (TXRU) per polarization. An analog distribution network with phase shifters is used to steer the beam of each panel. Multiple panels can be stacked next to each other and digital beamforming can be performed across the panels. FIG. 4 illustrates an example with two panels where each panel is connected to one TXRU per polarization.

In some examples, wideband digital beamforming is used instead of analog beam forming. This generally has the same functionality as analog beamforming, but the beamforming itself is performed digitally.

3. Spatial QCL Definition

In new radio, the term—spatial quasi-location (QCL)—has been adopted and applies to a relationship between antenna port(s) of two different downlink (DL) reference signals (RSs). If two transmitted DL RSs are configured by a base station to be spatially QCL at a UE receiver, then the UE may assume that the first DL RS and the second DL RS are transmitted with approximately the same transmission spatial filter configuration. Thus, the UE may use approximately the same receiving (RX) spatial filter configuration to receive the second DL RS as it is used to receive the first DL RS. In this way, spatial QCL is a term that assists in the use of analog beamforming and formalizes the notion of the "same UE Rx beam" over different time instances.

4. Spatial Relation Definition

In new radio, QCL applies to a relationship between the antenna port(s) of two different DL reference signals (RSs). If two transmitted DL RSs are configured by the BS to be spatially QCL at the UE receiver, then the UE may assume that the first and second RSs are transmitted with approximately the same TX spatial filter configuration. Thus, the UE may use approximately the same RX spatial filter configuration to receive the second reference signal as it used to receive the first reference signal. In this way, spatial QCL is a term that assists in the use of analog beamforming and formalizes the notion of "same UE Rx beam" over different time instances.

5. Synchronization Signal Block (SSB)

SSB is a broadcast signal in NR that helps with for example providing initial synchronization, basic system information used for initial access and mobility measurements. The structure of SSB can be found in FIG. 5. An SSB consists of one Primary Synchronization Signal (PSS), one Secondary Synchronization Signal (SSS), and a Physical Broadcast Channel (PBCH). For example, the PSS and SSS part of the SSB is transmitted over 127 sub-carriers, where the sub-carrier spacing can be 15/30 kHz for below 6 GHz and 120/240 kHz for above 6 GHz.

For low frequencies, as shown in FIG. 6A, it is expected that each cell 601 transmits one SSB 602 that covers the whole cell. For higher frequencies, several beamformed SSBs 603 are expected to be needed to attain coverage over the whole cell (shown in FIG. 6B). The max number of SSB per cell are: below 3 GHz=4; 3-6 GHz=8; above 6 GHz=64. The SSBs are transmitted in a SSB transmission burst which can last up to 5 ms. The periodicity of the SSB burst are configurable with the following options: 5, 10, 20, 40, 80, 160 ms.

6. Handover in New Radio

It is expected in New Radio (NR) (a.k.a., 5G Radio Access Network (RAN)) that mobility (i.e. cell selection) is based on SSB. In some examples, CSI-RS can also be configured for mobility measurements; however, using CSI-RS would require extra overhead compared to using SSB, because SSB are already transmitted for initial access and synchronization purposes. Mobility measurements are based on RSRP measurements performed on the SSS of the SSB. The RSRP measurements from respective cell are filtered using layer 3 filtering (as specified in section 5.5.3.2 of NR specification 3GPP TS 38.331 v15.6.0 ("TS 38.331")) and can be seen in Equation 1 below:

$$Fn = (1-a)*Fn-1 + a*Mn \qquad \text{(Eqn. 1),}$$

where Mn is the latest received measurement, Fn is the updated filtered measurement result and, Fn−1 is the old filtered measurement result. The parameter "a" defines how much of the latest measurement should be weighted compared to older measurements.

With a reasonable parameter setting of "a", the mobility measurement used for cell-selection is filtered over time to reduce the risk of ping-pong effects due to fast fading (i.e., unwanted handovers that move one UE back and forth between two (or more) cells). To further reduce the risk of ping-pong effects, the handover parameter setting usually is such that a handover trigger is met first when the candidate cell has a performance level (usually based on filtered RSRP) threshold larger than the serving cell.

The reporting of the mobility measurements from the UE to the TRP in new radio can be either periodic or event-based. For periodic reporting, the TRP configures the UE to report the mobility measurements periodically for all neighboring cells detected on the associated frequency (the UE reports up to a "maxCellReport" number of cells). For an event triggered report, the UE is configured to report mobility measurements for all cells defined by the parameter "triggeredCellsList" (again, up to a "maxCellReport" number of cells). The event trigger report is signaled from the UE when a number of criteria are met. There are 6 different event triggers A1-A6 for new radio, as described in section 5.5.4 of NR specification TS 38.331. For example, the UE sends an event triggered mobility report when the mobility measurements for a neighboring cell stronger than the serving cell mobility measurements+a certain threshold (the threshold is used to reduce ping-pong effects). In case the TRP detects (through a UE mobility report) that a neighboring cell is stronger than serving cell, it can initiate a handover process as illustrated in FIG. 7.

SUMMARY

Certain challenges exist with respect to beam management. For example, beam management is expected to mainly use aperiodic and/or semi-persistent CSI-RS resources (except for P1 procedure, where SSB or periodic CSI-RS are expected), and because the TRP beams used for beam management can change over time, there presently exists no time filtering in NR when performing beam measurements on semi-persistent or aperiodic CSI-RS resources. This can lead to ping-pong effects between different beams (at TRP and/or UE), which, in turn, can lead to unnecessary overhead signaling and/or sub-optimal beam selections.

Accordingly, in one aspect this disclosure provides a method for selecting a beam (a TX beam or an RX beam), which method reduces the probability of the TRP and UE experiencing a ping-pong effect. In one embodiment, the method includes a UE receiving a first reference signal that was transmitted by a base station using a first transmit beam selected by the base station. The method also includes the UE performing a first reference signal measurement (e.g., reference signal received power (RSRP) measurement, reference signal received quality (RSRQ) measurement, signal-to-noise and interference ratio (SINR) measurement) with respect to the received first reference signal, thereby producing a first measurement result (e.g., RSRP, RSRQ or SINR quantity). The method also includes the UE receiving a second reference signal that was transmitted by the base station using the first transmit beam. The method also includes the UE performing a second reference signal measurement (e.g., RSRP, RSRQ, or SINR measurement) with respect to the received second reference signal, thereby producing a second measurement result (e.g., RSRP, RSRQ, or SINR quantity). The method also includes the UE determining that a condition is satisfied, wherein determining that the condition is satisfied comprises the UE determining that the base station has transmitted to the UE a measurement result filtering indicator (MRFI) indicating (directly or indirectly) that the UE may filter its first and second measurement results. As a result of determining that the condition is satisfied, the UE derives a filtered measurement result based on the first measurement result and the second measurement result, and the UE selects a beam based on the filtered measurement result.

In another embodiment, the method for selecting a beam includes a base station using a first transmit beam to transmit a first reference signal to the UE. The method also includes the base station using a second transmit beam to transmit a second reference signal to the UE. The method also includes the base station receiving a first beam report transmitted by the UE. The first beam report includes i) a first measurement result produced by the UE in response to the UE receiving the first reference signal and ii) a second measurement result produced by the UE in response to the UE receiving the second reference signal. The method also includes the base station using the first transmit beam to transmit a third reference signal to the UE. The method also includes the base station using the second transmit beam or a third transmit beam to transmit a fourth reference signal to the UE. The method also includes the base station receiving a second beam report transmitted by the UE. For example, the second beam report includes: i) a third measurement result produced by the UE in response to the UE receiving the third reference signal and ii) a fourth measurement result produced by the UE in response to the UE receiving the fourth reference signal. The method also includes the base station calculating a filtered measurement result based on the first measurement result and the third measurement result. The method also includes using the filtered measurement result in a beam selection process for selecting a beam from a set of beams comprising the first beam and at least one of the second beam or the third beam.

In another embodiment, the method for selecting a beam includes the base station, as part of a first beam management procedure (e.g., first P2 sweep) using a first transmit beam to transmit to a UE a first reference signal. This enables the UE to produce a first measurement result associated with the first transmit beam. The method also includes the base station triggering a second beam management procedure (e.g., a second P2 sweep), wherein triggering the second beam management procedure comprises the base station transmitting to the UE a triggering message (e.g., DCI or MAC CE). The triggering message includes a measurement result filtering indicator (MRFI) indicating (directly or indirectly) that the UE may produce a filtered measurement result. The filtered measurement result is produced by filtering a second measurement result, which is produced by the UE during the second beam management procedure, using the first measurement result, which is produced by the UE during the first beam management procedure. The method further provides for, as part of the second beam management procedure, the base station using the first transmit beam to transmit to the UE a second reference signal. This second reference signal enables the UE to produce the second measurement result. The method further provides for, as part of the second beam management procedure, the base station receiving a beam report transmitted by the UE. The beam report comprises a resource indicator (e.g., CRI) selected by the UE using the filtered measurement result.

In another aspect the present disclosure provides a computer program comprising instructions, which, when executed by processing circuitry, causes the processing circuitry to perform any one of the methods described herein.

A main advantage of the embodiments is improved beam selection at the TRP and/or UE. In some examples, the embodiments provide reduced overhead signaling caused by ping pong effects of used TRP TX beam, which might need an updating of spatial QCL and/or spatial relations for the UE.

BRIEF DESCRIPTION OF THE DRAWINGS

The accompanying drawings, which are incorporated herein and form part of the specification, illustrate various embodiments.

FIG. 15 is a flow chart illustrating a process according to some embodiments.

DETAILED DESCRIPTION

As noted above, beam management is expected to use aperiodic and/or semi-persistent CSI-RS resources. Because the TRP TX beams used for beam management can be changed over time, there presently exists no time filtering in NR when performing measurements on semi-persistent or aperiodic CSI-RS resources and this can lead to ping-pong effects, which, in turn, can lead to unnecessary overhead signaling and/or sub-optimal beam selections.

Figure 1:
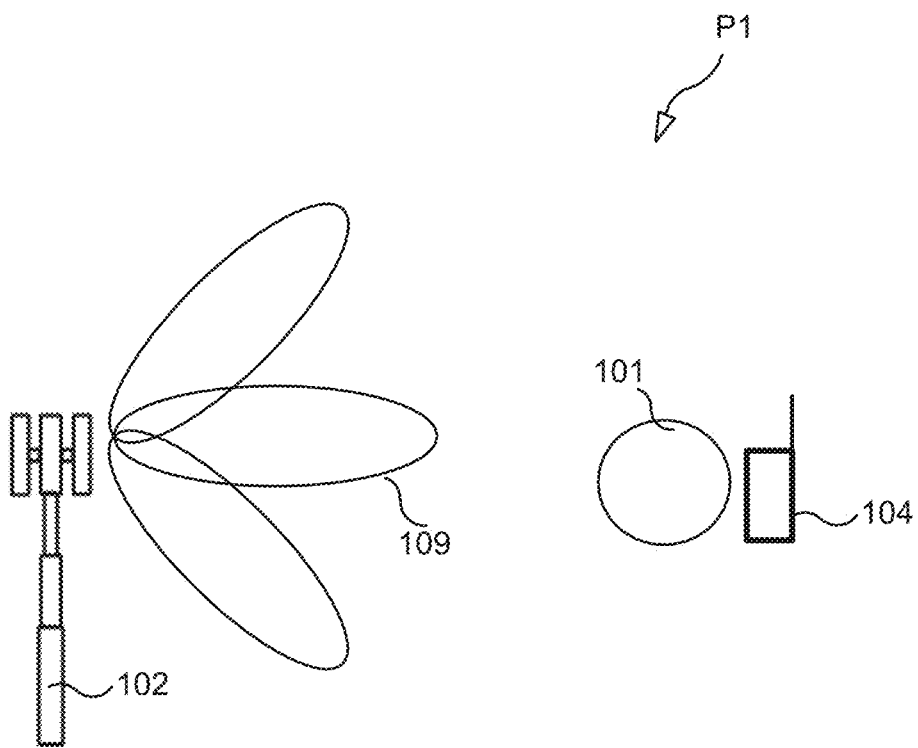
FIG. 1 illustrates a P1 beam sweep.
Figure 2A:
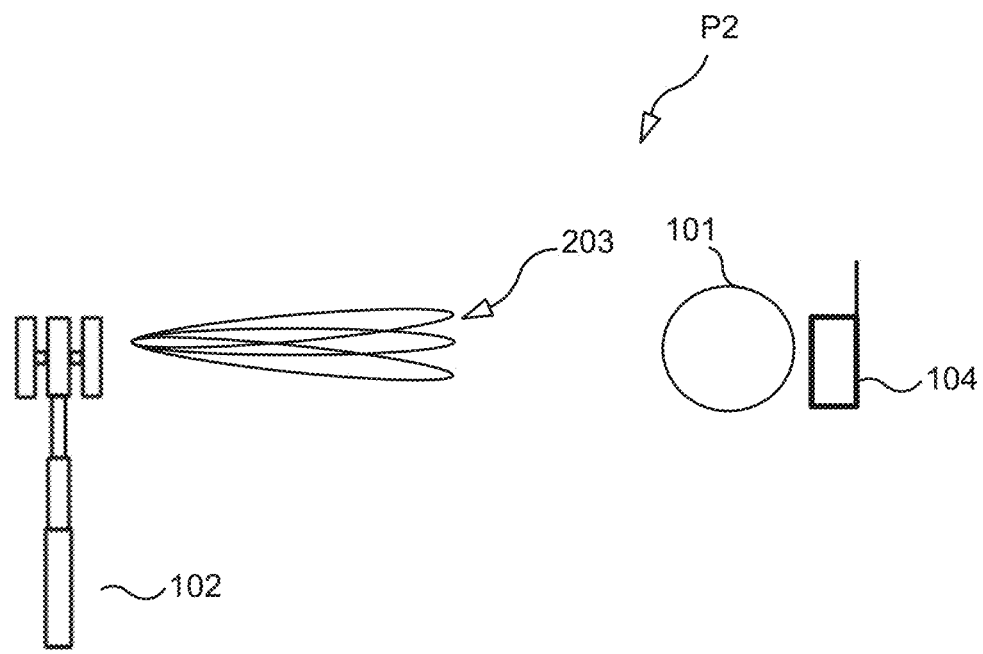
FIGS. 2A and 2B illustrate P2 and P3 beam sweeps, respectively.
Figure 2B:
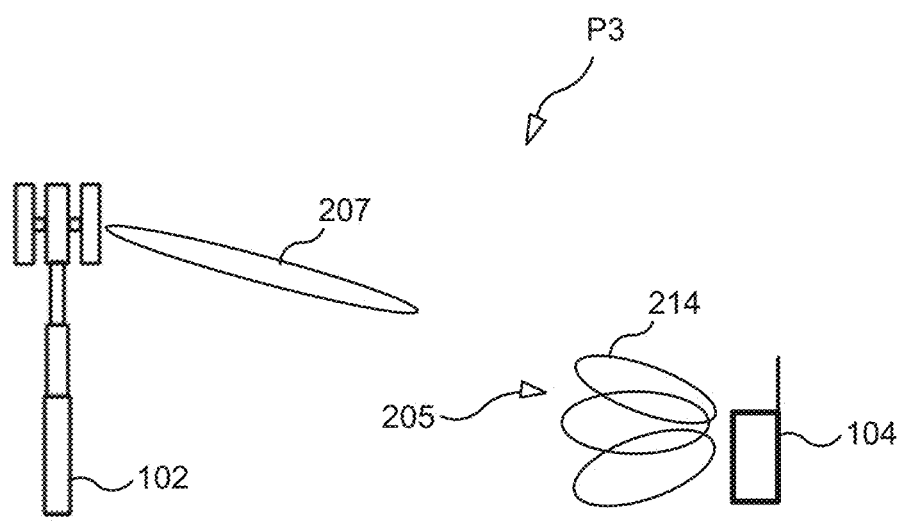
Figure 3:
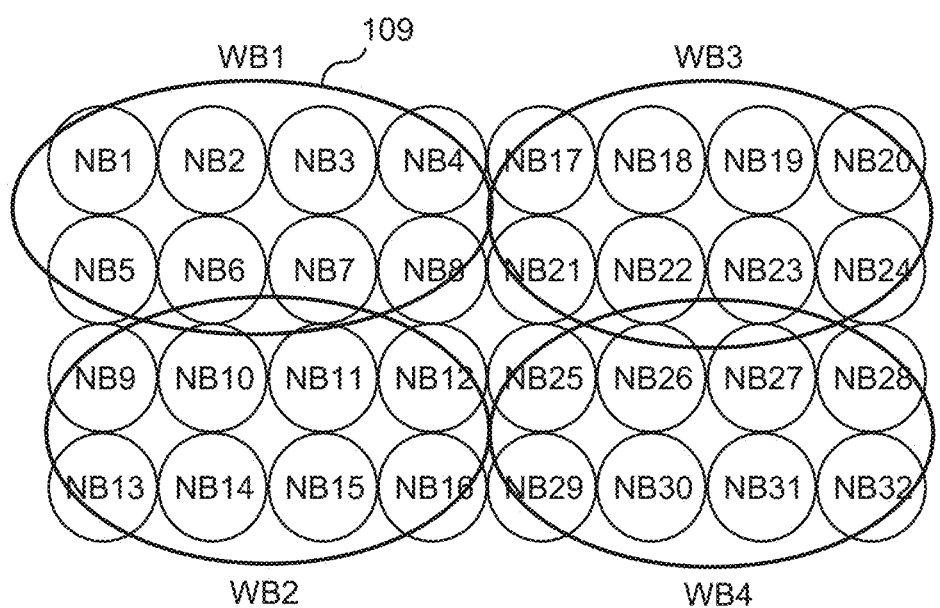
FIG. 3 illustrates various wide beams and narrow beams.
Figure 4:
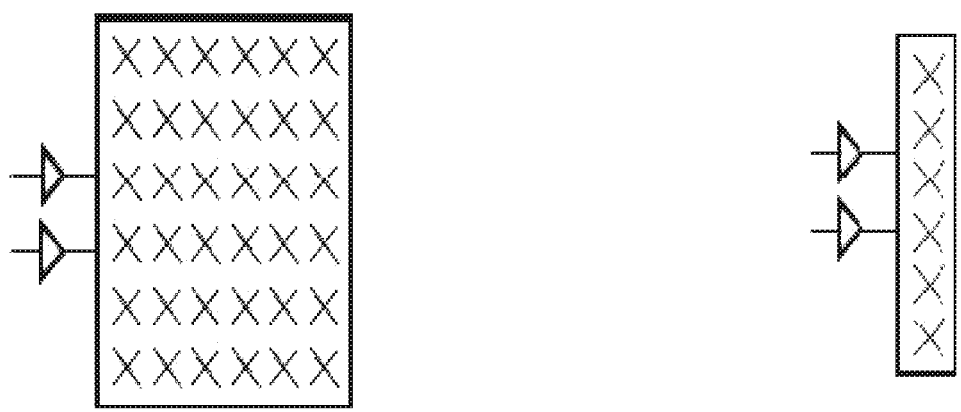
FIG. 4 illustrates exemplary antenna panels.
Figure 5:
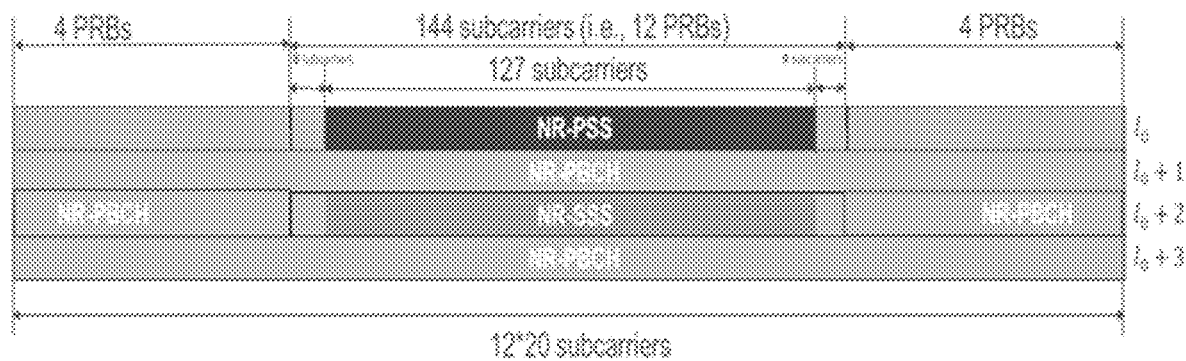
FIG. 5 shows an exemplary SSB.
Figure 6A:
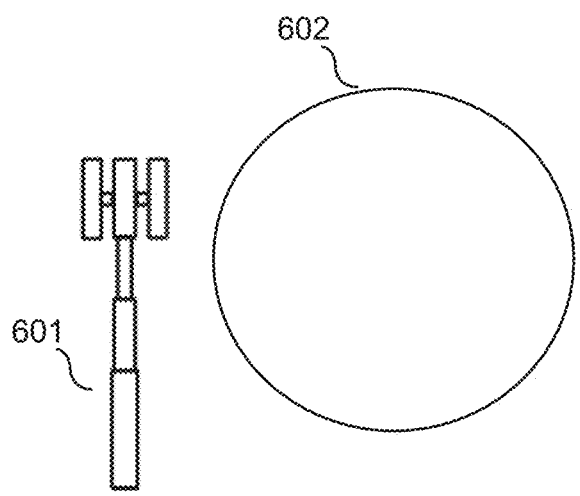
FIGS. 6A and 6B illustrate cell transmitting one or multiple SSBs, respectively.
Figure 6B:
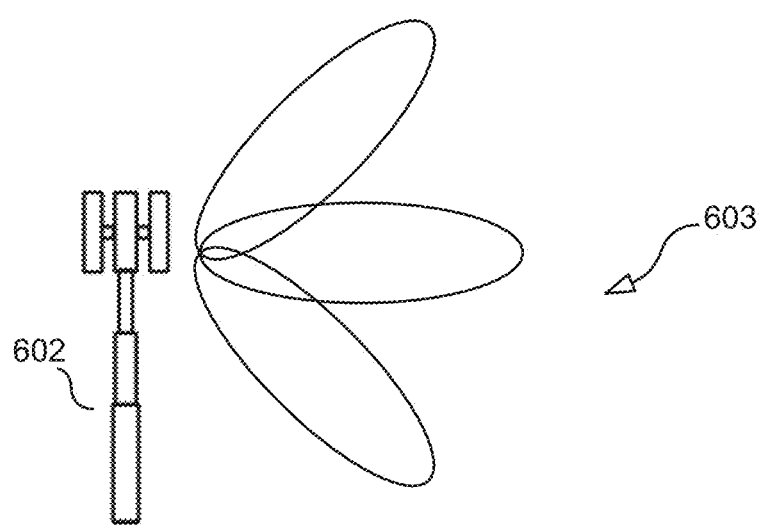
Figure 7:
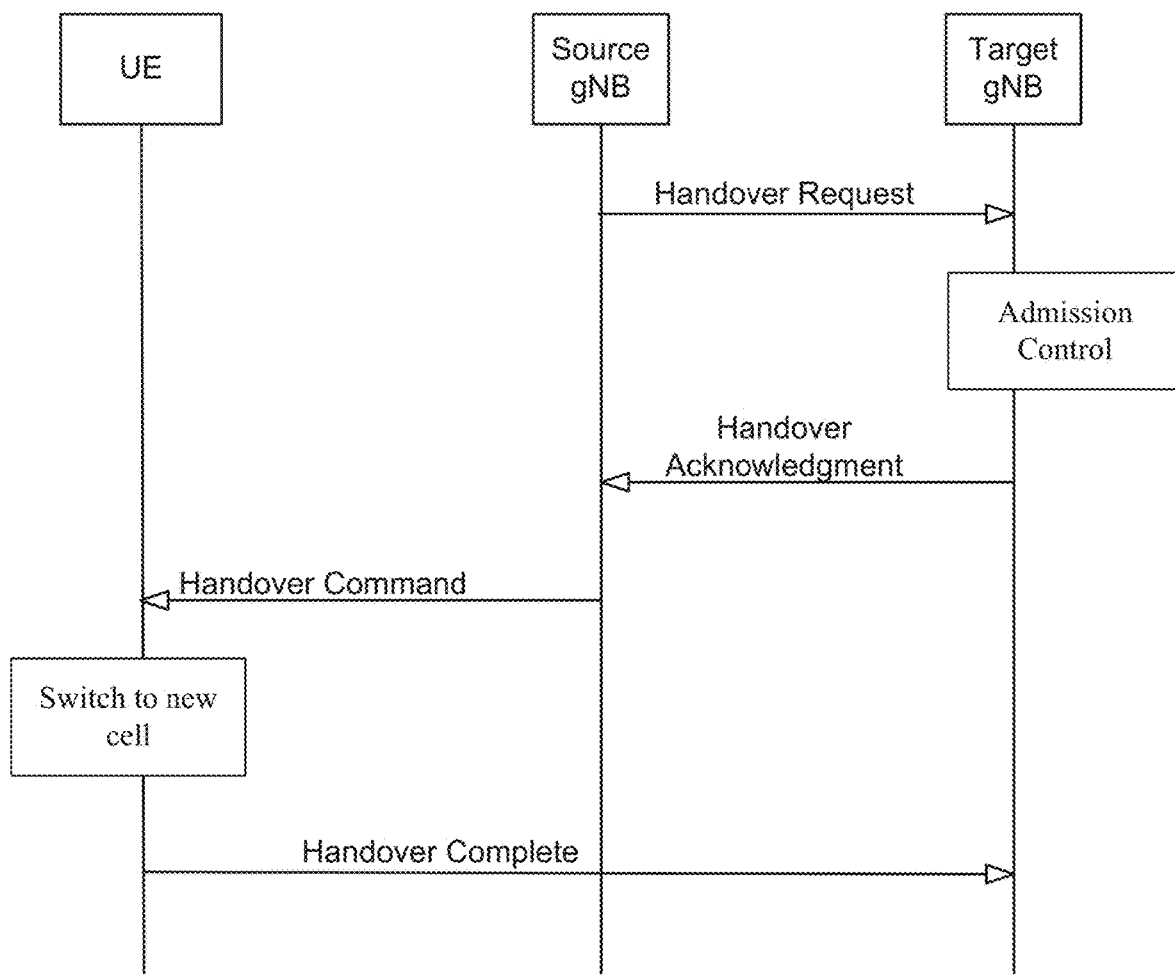
FIG. 7 illustrates a handover process.
Figure 8:
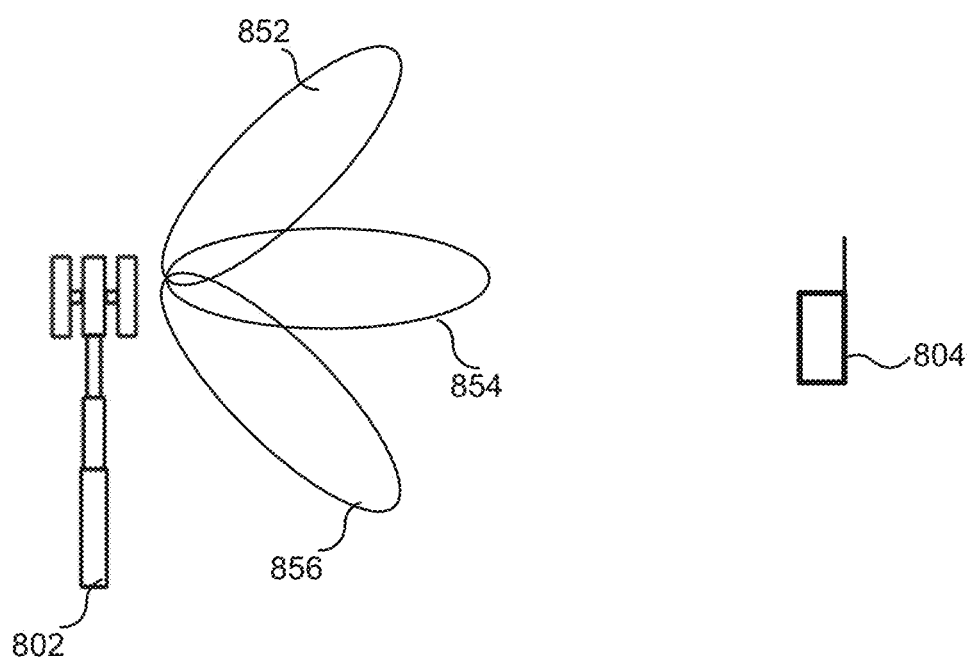
FIG. 8 illustrates an example selection process between TRP beams.

For example, referring to FIG. 8, assume that a UE 804 is configured with reporting the best TRP TX beam out of a set of TX beams 852, 854, and 856, and corresponding RSRP during aperiodic P2 beam sweeps and that the UE has almost equally good RSRP for two different TRP TX beams (e.g., beams 854 and 856) where TRP beam 854 has an average RSRP of −50 dBm and TRP beam 856 has an average RSRP of −52 dBm. Assume further that the base station 802 triggers aperiodic CSI-RS measurements regularly to evaluate if UE 804 has a new best TRP TX beam or not. Due to fast fading effects, it is likely that TRP beam 856 will be received with larger RSRP than TRP beam 854 for at least some percentages (say 20%) of P2 beam sweeps. In these cases, base station 802 will likely change the serving TRP beam from TRP beam 854 to TRP beam 856, even though TRP beam 854 is better in average. Changing the serving TRP beam from TRP beam 854 to TRP beam 856 is likely to temporarily reduce the performance (until the TRP switches back to TRP beam 854 again during a later P2 sweep) and might cause unnecessary overhead signaling due to potential updates of spatial QCL and/or spatial relations due to change of TRP TX beam.

As used herein, UE 804 may be any device capable of wirelessly communicating with base station 802. For example, UE 804 may be a mobile phone, a tablet, a laptop, a sensor (or other internet of things (IoT) device), or any other device with wireless communication capabilities. The base station 802 may be any network entity that is capable of wirelessly communicating with UEs and providing network access to the UEs. For example, in one embodiment base station 802 is a 5G base station (gNB).

Figure 9:
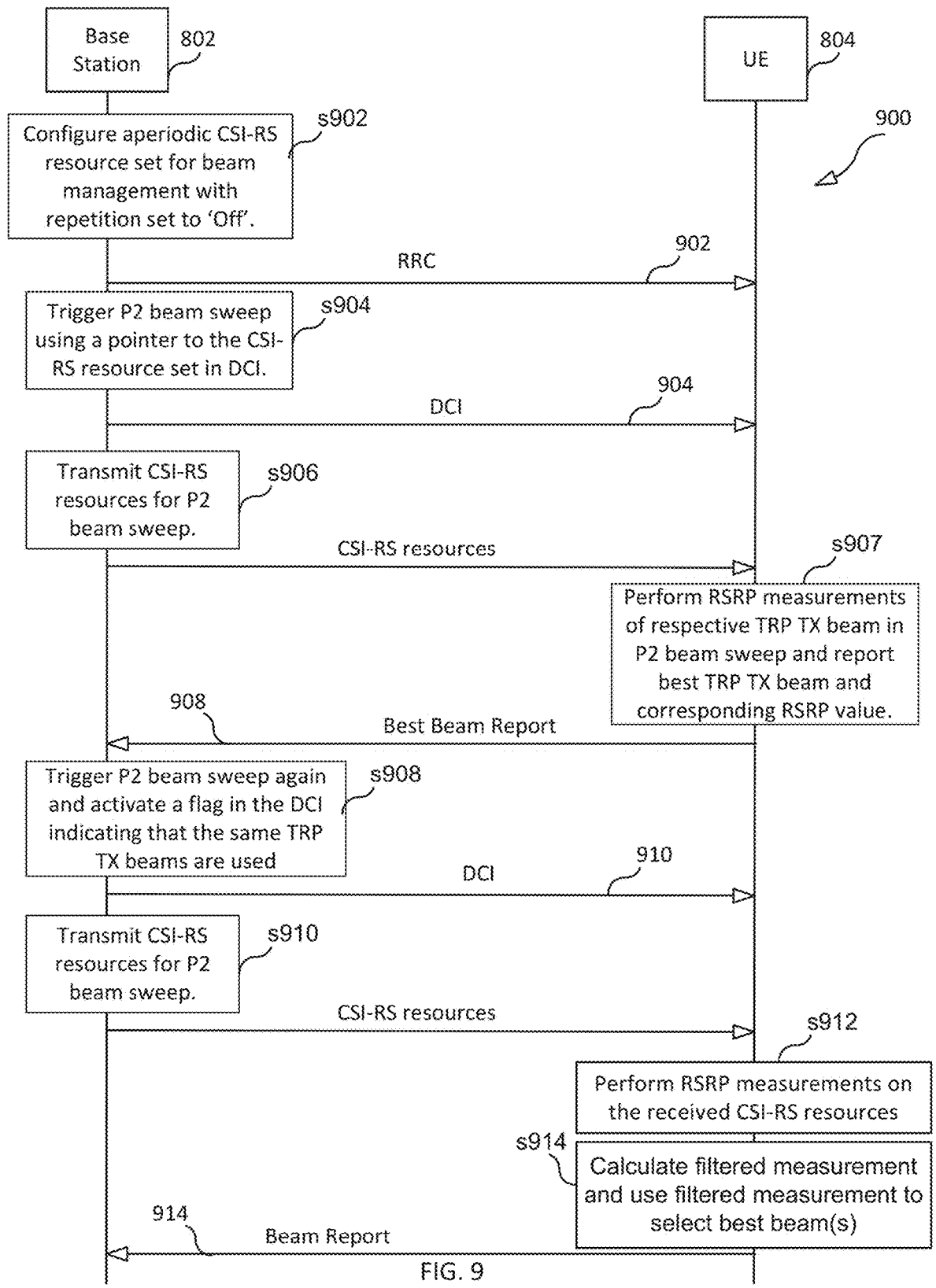
FIG. 9 is a message flow diagram illustrating a process according to some embodiments.

FIG. 9 is a message flow diagram illustrating a message flow 900 according to an embodiment. In this embodiment, base station 802 includes a flag in a DCI (e.g., DCI Format 0_1) that identifies a CSI-RS resource set for beam management, where the flag indicates if the CSI-RS resources in the CSI-RS resources set are transmitted using the same TRP TX beams that were used the last time the CSI-RS resource set was triggered for beam management. This allows UE 804 to perform filtering of multiple P2 or multiple P3 beam sweeps. This will improve the TRP TX and/or UE RX beam selection and reduce potential extra overhead signaling needed for updating spatial QCL and/or spatial relations.

As illustrated in FIG. 9, in step s902, base station 802 configures UE 804 with an aperiodic P2 beam sweep. For example, step s902 includes base station 802 transmitting to UE 804 a Radio Resource Control (RRC) message 902 (e.g., RRC Reconfiguration message) that comprises measurement configuration information that configures the UE with a CSI-RS resource set for beam management. For example, the measurement configuration information may include, among other things, a trigger state information element (IE) (an IE is a data structure containing data and/or a set of one or more other IEs) that contains an associated report IE that contains a pointer (i.e., an index) to a particular CSI-RS resource set contained in a report setting identified by an identifier included in the associated report IE. This report setting may be included in the RRC message 902 or a different RRC message sent to UE 804.

This CSI-RS resource set identifies M CSI-RS resources (e.g., M=4) and each CSI-RS resource is identified by CRI. As explained above, in a P2 beam sweep, for each one of the M CSI-RS resources, base station 802 uses a different TRP TX beam to transmit a CSI-RS. Thus, by measuring the RSRP for each CSI-RS transmission, UE 804 can determine the CSI-RS resource associated with the highest RSRP value and then transmit to the base station a beam report comprising the CRI that identifies the determined CSI-RS resource. In this way, base station 802 can determine which TRP TX beam performed the best and then select to use that beam when communicating with UE 804.

In this example, the repetition flag associated with the CSI-RS resource set is set of "off" because base station will use the CSI-RS resource set for a P2 beam sweep. When the repetition flag is set to "off," UE 804 should not assume that all reference signals within the resource set are transmitted using the same spatial filter (i.e., TRP TX beam), otherwise the UE should assume that all reference signals within the resource set are transmitted using the same spatial filter.

In step s904, base station 802 triggers a first P2 beam sweep using DCI. That is, in step s904 base station 802 transmits to UE 804 a DCI (e.g., DCI format 0_1) that contains a code point that points to the CSI-RS resource set. More specifically, the code point points to a trigger state IE, and this trigger state IE includes an associated report IE that contains a pointer (i.e., index) to a particular resource set contained in a report setting identified by an identifier included in the associated report IE.

In this embodiment, the DCI includes a measurement result filtering indicator (MRFI) that consists of an MRFI flag (e.g., a one bit flag or a multiple bit flag) that is contained within the CSI request field of the DCI. The MRFI indicates whether or not the TRP TX beams that will be used for the triggered P2 beam sweep are the same TRP TX beams that were used for the previous P2 beam sweep. That is, the MRFI indicates whether the UE may filter its measurement results.

Because this is the first P2 beam sweep, the MRFI (one bit flag in this case) can be either 0 or 1 as the UE has no previous measurement values, and, therefore, cannot produce a filtered measurement value. But, in one embodiment, the first time a P2 sweep is triggered the flag may be set to 1 to indicate that it is likely that the next P2 beam sweep will also use a flag set to 1, which then would indicate to the UE that it is beneficial for the UE to store the RSRP measurements for this first P2 beam sweep so that they can be used to calculate filtered RSRP for a following P2 beam sweep if desired.

In step s906, base station 802 transmits the CSI-RS resources in different TRP TX beams. That is, for example, in step s906 base station 802 uses a first TRP TX beam to transmit a first CSI-RS and uses a second TRP TX beam to transmit a second CSI-RS.

In step s907, the UE performs RSRP measurements on the transmitted CSI-RS resources (CSI-RS reference signals) and transmits to base station 802 a beam report 908 that identifies the best TRP TX beam(s) (e.g., the CSI-RS resource index (CRI) with highest RSRP value) and contains the corresponding RSRP value(s). In other embodiments, UE performs RSRP or SINR measurements, but for the same of brevity we will use RSRP measurements to illustrate the embodiments.

In step s908, base station 802 triggers another P2 beam sweep by transmitting DCI 910 and indicates in the DCI that the same TRP beams will be used for this P2 beam sweep as was used during the last P2 beam sweep (i.e., the one triggered by DCI 904). For example, the MRFI in DCI 910 is set to 1.

In step s910, base station 802 transmits the CSI-RS resources in the same TRP TX beams (i.e., maps the same CSI-RS resources to the same TRP TX beams).

In step s912, UE 804 performs RSRP measurements on the received CSI-RS resources. For example, assuming that the P2 sweep comprises base station 802 transmitting a reference signal using a CSI-RS resource (e.g., a resource identified by CRI-1), then, in step s912, UE 804 produces a measurement result (an RSRP value in this case) corresponding to the first reference signal and associates the measurement result with CRI-1.

In step s914, UE 804 derives filtered measurement results. For instance, UE 804 derives a first filtered measurement result based on a measurement result obtained in step s912 and associated with CRI-1 and a previous measurement result obtained in step s907 and associated with CRI-1 (i.e., the measurement result produced as a result of receiving the reference signal transmitted on the resource identified by CRI-1). In one embodiment, deriving the first filtered measurement result (denoted Fn) comprises UE 804 calculating: $Fn=(1-a)(F_{n-1})+aM_n$, where, in this case, $F_{n-1}$ is the measurement result obtained in step s907 that is associated with CRI-1 and $M_n$ is the measurement result obtained in step s912 that is associated with CRI-1. But other filter functions may be used.

In deriving the filtered measurement results, UE 804 determines a suitable value for coefficient used in the filter function (e.g., coefficient "a"). For example, UE 804 can set the value of the "a" coefficient based on, among other values: i) the amount of time between the two P2 beam sweeps, ii) how much the UE has moved (e.g. magnitude of a lateral displacement), and/or how much the UE has rotated. The filter coefficient may also be configured to the UE by a network node (e.g., base station 802).

Accordingly, in step s914, UE 804 uses a filter function and determines a filtered RSRP value for respective TRP TX beam, determines which TRP beam that has the highest filtered RSRP value and reports back the beam index (CRI) to the TRP together with the filtered RSRP value for that TRP beam (see beam report 914).

In an alternative embodiment, the UE is assumed to always perform filtering of the CSI-RS measurements, but to clear out the filter buffer if the MRFI is set to a specific value (e.g. '1'). This way, when base station 802 changes the TX beams applied to the CSI-RS resources the gNB can indicate that the UE should flush its CSI-RS memory buffers. Alternatively, the UE flushes out its CSI-RS memory buffers when the flag is toggled compared to the previously triggered beam report of the same type. In this fashion, there is no risk that the CSI-RS channel filter becomes "corrupt" if the UE misses a DCI where the flag is equal to '1'.

In another embodiment, instead of the MRFI containing or consisting of an MRFI flag, the MRFI may be a code point of the CSI request field, where the code point points to a trigger state IE (e.g., an IE similar to the CSI-Aperiodic-TriggerState IE defined in TS 38.331) that contains a least one associated report configuration IE (e.g., an IE similar to the CSI-AssociatedReportConfigInfo IE defined in TS 38.331), and either or both of the trigger state IE or the associated report configuration IE includes the MRFI flag that informs the UE as to whether or not the TRP TX beams that will be used for the triggered P2 beam sweep are the same TRP TX beams that were used for the previous P2 beam sweep. That is, the MRFI flag indicates whether the UE may filter its measurement results. Hence, in this embodiment the MRFI included in the DCI indirectly indicates to UE 804 whether the UE may filter its measurement results. This embodiment is illustrated in the tables below. Table 1 shows a trigger state IE having the MRFI flag and Table 2 shown an associated report configuration IE having the MRFI flag.

TABLE 1

```
CSI-AperiodicTriggerState ::= SEQUENCE {
  MRFI_Flag                                    INTEGER
  associatedReportConfigInfoList               SEQUENCE
    (SIZE(1..maxNrofReportConfigPerAperiodicTrigger))
    OF CSI-AssociatedReportConfigInfo,
  ...
}
```

TABLE 2

```
CSI-AssociatedReportConfigInfo ::= SEQUENCE {
  MRFI_Flag INTEGER
  reportConfigId                         CSI-ReportConfigId,
  resourcesForChannel
    resourceSet                          CHOICE { nzp-CSI-RS SEQUENCE{
  (1..maxNrofNZP-CSI-RS- ResourceSetsPerConfig),   INTEGER
    qcl-info                             SEQUENCE (SIZE(1..maxNrofAP-CSI-RS-
                                                   ResourcesPerSet)) OF TCI-StateId
                                                   OPTIONAL -- Cond Aperiodic
  },
    csi-SSB-ResourceSet                  INTEGER (1..maxNrofCSI-SSB-
    ResourceSetsPerConfig)
  },
  csi-IM-ResourcesForInterference              INTEGER(1..maxNrofCSI-IM-
  ResourceSetsPerConfig), nzp-CSI-RS-ResourcesForInterference  INTEGER
  (1..maxNrofNZP-CSI-RS-
  ResourceSetsPerConfig)
  ...
}
```

Figure 10:
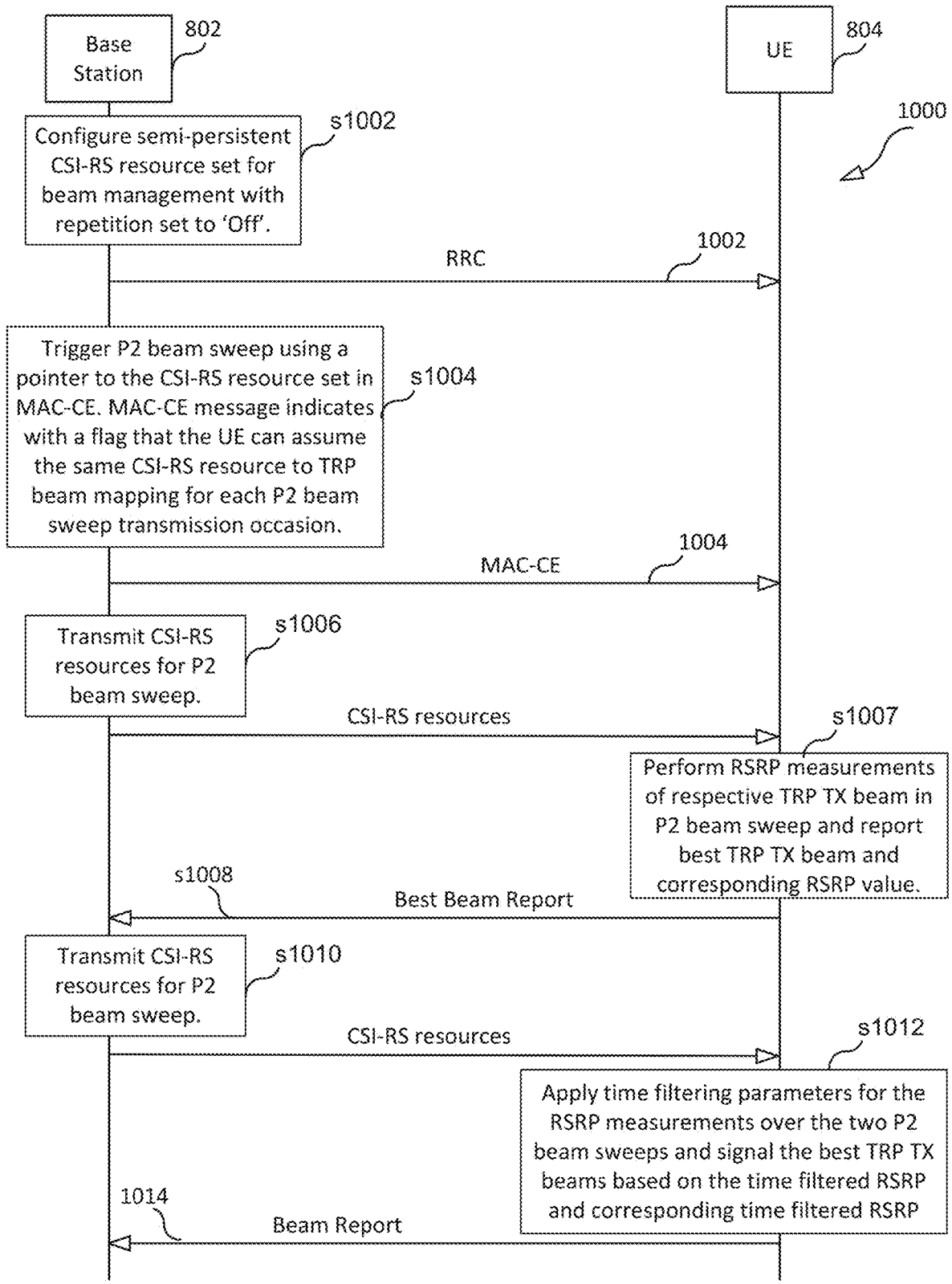
FIG. 10 is a flow chart illustrating a process according to some embodiments.

FIG. 10 is a message flow diagram illustrating a message flow 1000 according to another embodiment. In this embodiment, base station 802 includes a flag in a MAC-CE message that identifies a CSI-RS resource set for beam management, where the flag indicates if the CSI-RS resources in the CSI-RS resource set are transmitted using the same TRP TX beams that were used the last time the CSI-RS resource set was triggered for beam management. This embodiment provides the same advantages as those discussed above regarding FIG. 9. This example is almost identical to the example described above regarding FIG. 9, except that semi-persistent CSI-RS resources are used instead of aperiodic. This means that a MAC-CE message is used to trigger the P2 beam sweep instead of DCI; hence, the flag indicating that the same TRP TX beams will be used for different P2 beam sweep occasions is included in the MAC-CE message.

As illustrated in FIG. 10, in step s1002, base station 802 configures UE 804 with a semi-persistent P2 beam sweep. For example, step s1002 includes base station 802 transmitting to UE 804 a RRC message 1002 (e.g., RRC Reconfiguration message) that comprises measurement configuration information that configures the UE with a "semi-persistent" CSI-RS resource set for beam management. Like the CSI-RS resource set explained above with respect to FIG. 9, this CSI-RS resource set may identify M CSI-RS resources (e.g., M=4) and each CSI-RS resource is identified by CRI.

In this example, similar to message flow 900 of FIG. 9, the repetition flag associated with the CSI-RS resource set in s1002 is set to "off" because base station 802 will use the CSI-RS resource set for a P2 beam sweep.

In step s1004, base station 802 triggers a first P2 beam sweep using a pointer to the CSI-RS resource set in a MAC Control Element (MAC-CE) (e.g., like the one defined in 3GPP TS 38.321 V15.3.0 at section 6.1.3.12). That is, in step s1004, base station 802 transmits to UE 804 a MAC-CE message 1004 that contains an MRFI that indicates (directly or indirectly) that the UE can assume that the same CSI-RS resource to TRP beam mapping for each P2 beam sweep transmission occasion. For example, in one embodiment, the MRFI included in the MAC-CE can be a resource set identifier (e.g., an SP CSI-RS resource set ID) which is an index to the semi-persistent resource set (e.g., a NZP-CSI-RS-ResourceSet containing Semi Persistent NZP CSI-RS resources) that includes an MRFI flag. In another embodiment, the MRFI included in the MAC-CE can itself include or consist of the MRFI flag. In the embodiments in which the MRFI included in the MAC-CE is an MRFI flag, the MAC-CE 1004 will also contain a resource set identifier for identifying the semi-persistent CSI-RS resource set for beam management.

In step s1006, base station 802 transmits the CSI-RS resources in different TRP TX beams. That is, for example, in step s1006 base station 802 uses a first TRP TX beam to transmit a first CSI-RS and uses a second TRP TX beam to transmit a second CSI-RS.

In step s1007, UE 804 performs RSRP measurements on the transmitted CSI-RS resources (CSI-RS reference signals) and transmits to base station 802 a beam report 1008 that identifies the best TRP TX beam(s) (e.g., the CSI-RS resource index (CRI) with highest RSRP value) and contains the corresponding RSRP value(s).

In step s1010, base station 802 transmits the CSI-RS resources in the same TRP TX beams (i.e., maps the same CSI-RS resources to the same TRP TX beams). Therefore, step s1010 performs another P2 beam sweep.

In step s1012, UE 804 applies time filtering parameters for the two RSRP measurements over the first P2 beam sweep (performed at step s1006) and the second P2 beam sweep (performed over step s1010). The time-filtering of step s1012 can be as provided for above regarding steps s912 and s914 of FIG. 9. Accordingly, in step s1012, UE 804 uses a filter function and determines a filtered RSRP value for respective TRP TX beams, determines which TRP beam that has the highest filtered RSRP value, and reports back to base station 802 at least the beam index (CRI) together with the filtered RSRP value for that TRP beam (see beam report 1014).

Figure 11:
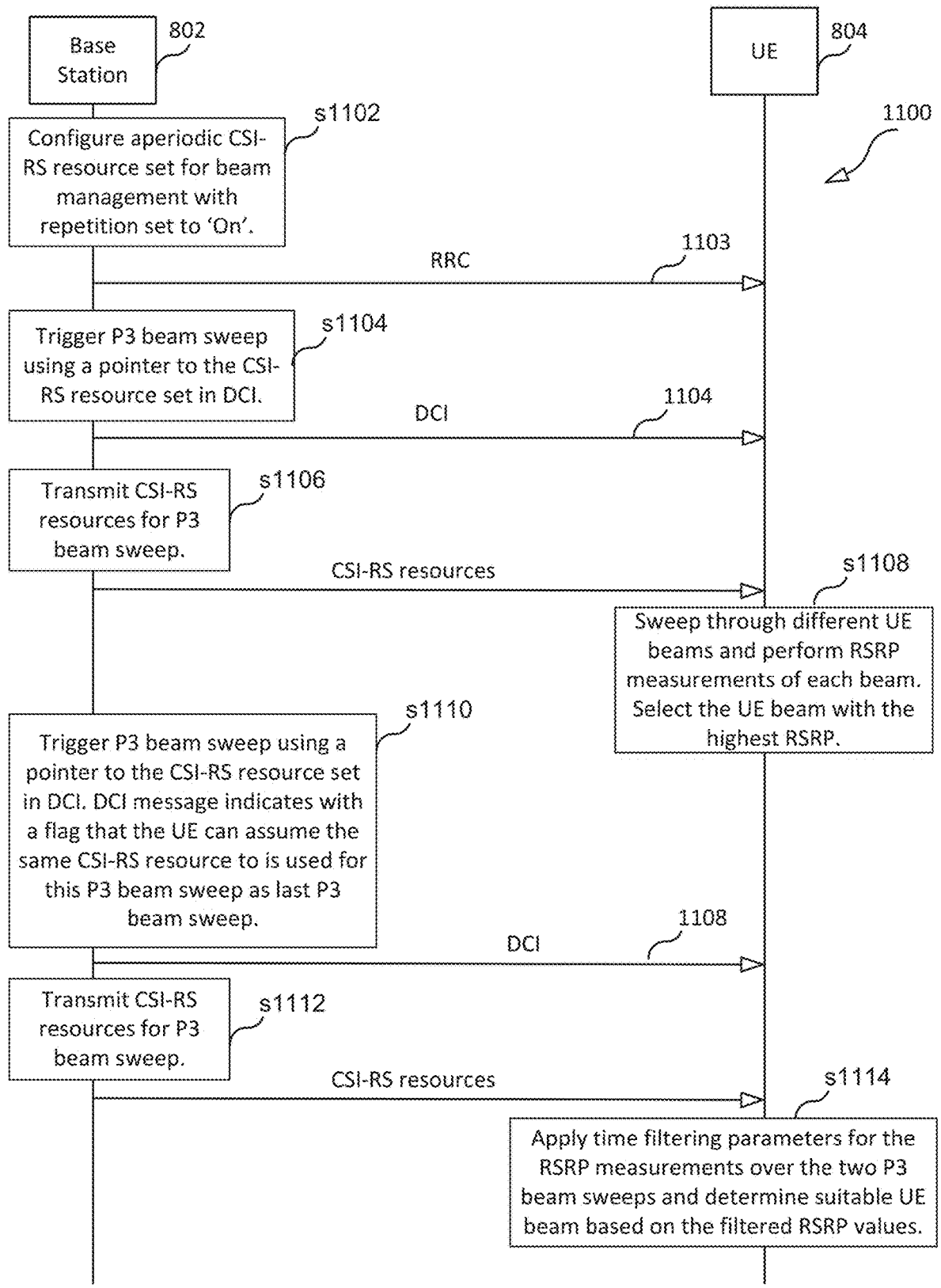
FIG. 11 is a flow chart illustrating a process according to some embodiments.

FIG. 11 is a message flow diagram illustrating a message flow 1100 according to an embodiment. In this embodiment, a P3 beam sweep is performed instead of a P2 beam sweep. Accordingly, UE 804 determines a best UE RX beam based on time filtered RSRP measurements. Similar to the advantages of message flow 900 in FIG. 9, message flow 1100 improves the base station and/or UE beam selection process in a P3 beam sweep. Message flow 1100 further reduces potential extra overhead signaling needed for updating spatial QCL and/or spatial relations.

As illustrated in FIG. 11, in step s1102, base station 802 configures UE 804 with an aperiodic P3 beam sweep. For example, step s1102 includes base station 802 transmitting to UE 804 a RRC message 1103 (e.g., RRC Reconfiguration message) that comprises measurement configuration information that configures the UE with an aperiodic CSI-RS resource set for beam management with the repetition flag set to "on." In this example, the repetition flag associated with the CSI-RS resource set is set of "on" because base station has selected a best TRP TX beam based on, for example, a previously-completed P2 beam sweep and UE best beam report (e.g., as shown in FIGS. 9 and 10). Therefore, UE 804 can assume that all reference signals within the resource set are transmitted using the same spatial filter (e.g., the best TRP TX beam as indicated in the beam report from UE 804).

In step s1104, base station 802 triggers a first P3 beam sweep using DCI. That is, in step s1104 base station 802 transmits to UE 804 a DCI 1104 (e.g., DCI format 0_1) that contains a code point that points to the CSI-RS resource set. The code point can be as described above regarding FIG. 9.

In this embodiment, the DCI includes an MRFI (e.g., an MRFI flag) that is contained within the CSI request field of the DCI. Because this is the first P3 beam sweep, the MRFI flag can be either 0 or 1 as the UE has no previous measurement values, and, therefore, cannot produce a filtered measurement value.

In step s1106, base station 802 transmits a burst of CSI-RS resources in the selected TRP TX beam (e.g., as chosen in a P2 procedure).

In step s1108, the UE 804 uses different UE RX beams to receive each of the burst of CSI-RS resources transmitted by the base station 802. For example, UE 804 sweeps through different UE RX directional beams, performing measurements on the CSI-RS, and selects a preferred UE RX directional beam, according to various UE implementations. For example, UE 804 selects the UE beam with the highest RSRP.

In step s1110, base station 802 triggers another P3 beam sweep by transmitting to UE 804 a DCI 1108 that includes an MRFI that indicates that the same TRP beam will be used for this P3 beam sweep as was used during the last P3 beam sweep (i.e., the one triggered by DCI 1104). That is, the MRFI included in DCI 1108 indicates (directly or indirectly) that UE 804 may perform measurement filtering to select the best UE RX beam. For example, the MRFI in DCI 1108 may be a single bit set to the value of 1.

In step s1112, base station 802 transmits a burst of CSI-RS resources in the same TRP TX beam from s1106 (i.e., maps the same CSI-RS resources to the same TRP TX beam).

In step s1114, UE 804 applies time filtering parameters for the two RSRP measurements over the first P3 beam sweep (performed at step s1106) and the second P3 beam sweep (performed over s1110). The time-filtering of step s1112 can be as provided for above regarding steps s912 and s914 of FIG. 9. Accordingly, in step s1112, UE 804 uses a filter function and determines a filtered RSRP value for respective UE RX beams, determines which UE RX beam has the highest filtered RSRP value.

Figure 12:
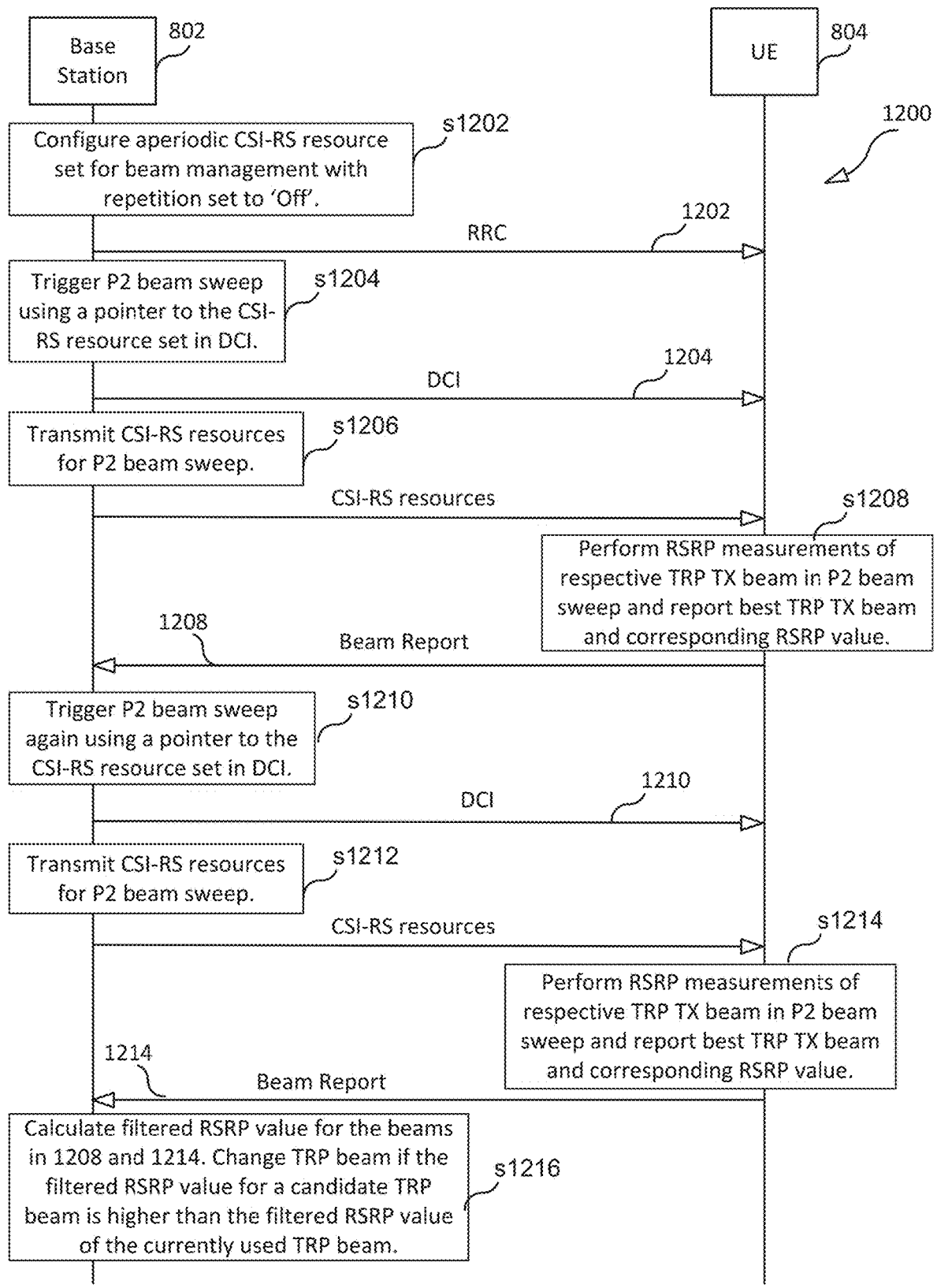
FIG. 12 is a message flow diagram illustrating a process according to some embodiments.

FIG. 12 is a message flow diagram illustrating a message flow 1200 according to an embodiment. In this embodiment, UE 804 does not perform beam management measurement filtering (i.e., no MRFI is provided to UE 804). Therefore, UE 804 has no indication to filter the RSRP measurements of aperiodic or semi-persistent CSI-RS resources for beam management over time (i.e., as is specified in the current new radio specification). Instead, base station 802 configures UE 804 to report the N best TRP TX beams and corresponding RSRP values. This reporting of the N best TRP TX beams and corresponding RSRP values requires more overhead signaling compared to letting the UE only report the single best TRP TX beam and its corresponding RSRP. Base station 802 then performs time filtering of the reported RSRP values for the reported TRP TX beams, and does not change the TRP TX beam until the time filtered RSRP for a certain TRP TX beam becomes better than the time filtered RSRP value of the currently used TRP TX beam. In an additional embodiment, an extra threshold is included when comparing the time filtered RSRP for candidate and current TRP beams (in similar way as is done for handovers conventionally).

As illustrated in FIG. 12, in step s1202, base station 802 configures UE 804 with an aperiodic P2 beam sweep. For example, step s1202 includes base station 802 transmitting to UE 804 a RRC message 1202 that configures the UE with a CSI-RS resource set for beam management. In this example, the repetition flag associated with the CSI-RS resource set is set to "off" because base station 802 will use the CSI-RS resource set for a P2 beam sweep.

In step s1204, base station 802 triggers a first P2 beam sweep using DCI. That is, in step s1204 base station 802 transmits to UE 804 a DCI (e.g., DCI format 0_1) that contains a code point that points to the CSI-RS resource set.

In step s1206, base station 802 transmits the CSI-RS resources in different TRP TX beams. That is, for example, in step s1206 base station 802 uses a first TRP TX beam to transmit a first CSI-RS and uses a second TRP TX beam to transmit a second CSI-RS.

In step s1208, the UE performs RSRP measurements on the transmitted CSI-RS resources (CSI-RS reference signals) and transmits to base station 802 a beam report 1208 that identifies the N best TRP TX beams and contains the corresponding RSRP values for these N TRP TX beams.

In step s1210, base station 802 triggers another P2 beam sweep by transmitting DCI 1210.

In step s1212, base station 802 transmits the CSI-RS resources in the same TRP TX beams (i.e., maps the same CSI-RS resources to the same TRP TX beams). Therefore, step s1210 performs another P2 beam sweep.

In step s1214, UE 804 performs RSRP measurements on the received CSI-RS resources. For example, assuming that the P2 sweep comprises base station 802 transmitting a reference signal using a CSI-RS resource (e.g., a resource identified by CRI-1), then, in step s1214, UE 804 produces a measurement result (an RSRP value in this case) corresponding to the first reference signal and associates the measurement result with CRI-1. UE 804 transmits to base station 802 a beam report 1214 that identifies the N best TRP TX beams and contains the corresponding RSRP values for these N TRP TX beams.

In step s1216, base station 802 applies time filtering parameters for the two RSRP measurements over the first P2 beam sweep (received from UE 804 in beam report 1208) and the second P2 beam sweep (received from UE 804 in beam report 1214). The time-filtering of step s1216 can be as provided for above regarding steps s912 and s914 of FIG. 9. Accordingly, in step s1216, base station 802 uses a filter function and determines a filtered RSRP value for each respective TRP TX beam, determines which TRP beam that has the highest filtered RSRP value. Base station 802 further provides for, in step s1216, changing the TRP TX beam if the filtered RSRP value for a candidate TRP beam is higher than (or threshold higher than) the filtered RSRP value of the currently-used TRP beam.

As the above demonstrates, message flow 1200 is an implementation that does not require any changes to UE 804, and works for P2 beam sweep. This implementation requires that multiple TRP beams (e.g., multiple CRIs) and their corresponding RSRP values are reported by the UE in the beam report.

In the first steps (e.g., steps 1202, 1204, and 1206), base station 802 performs as usual when executing P2 beam sweeps. However, in the last step, when base station 802 has received beam reports for two (or more) P2 beam sweeps, base station 802 determines suitable filter parameters for calculating a time filtered measurement value (e.g., RSRP, SINR, etc.) for the different reported TRP beams. Base station 802 then determines a suitable TRP beam based on the filtered measurement values. In one embodiment, base station 802 select a new candidate beam if the filtered measurement result of the candidate TRP beam is higher than the filtered measurement result of the current used TRP beam+a threshold (to reduce the risk of ping pong effects). Thus, in some embodiments, UE 804 performs SINR measurements and reports instead of RSRP. Base station 802 similarly calculates filtered SINR measurements instead of RSRP measurements.

Figure 13:
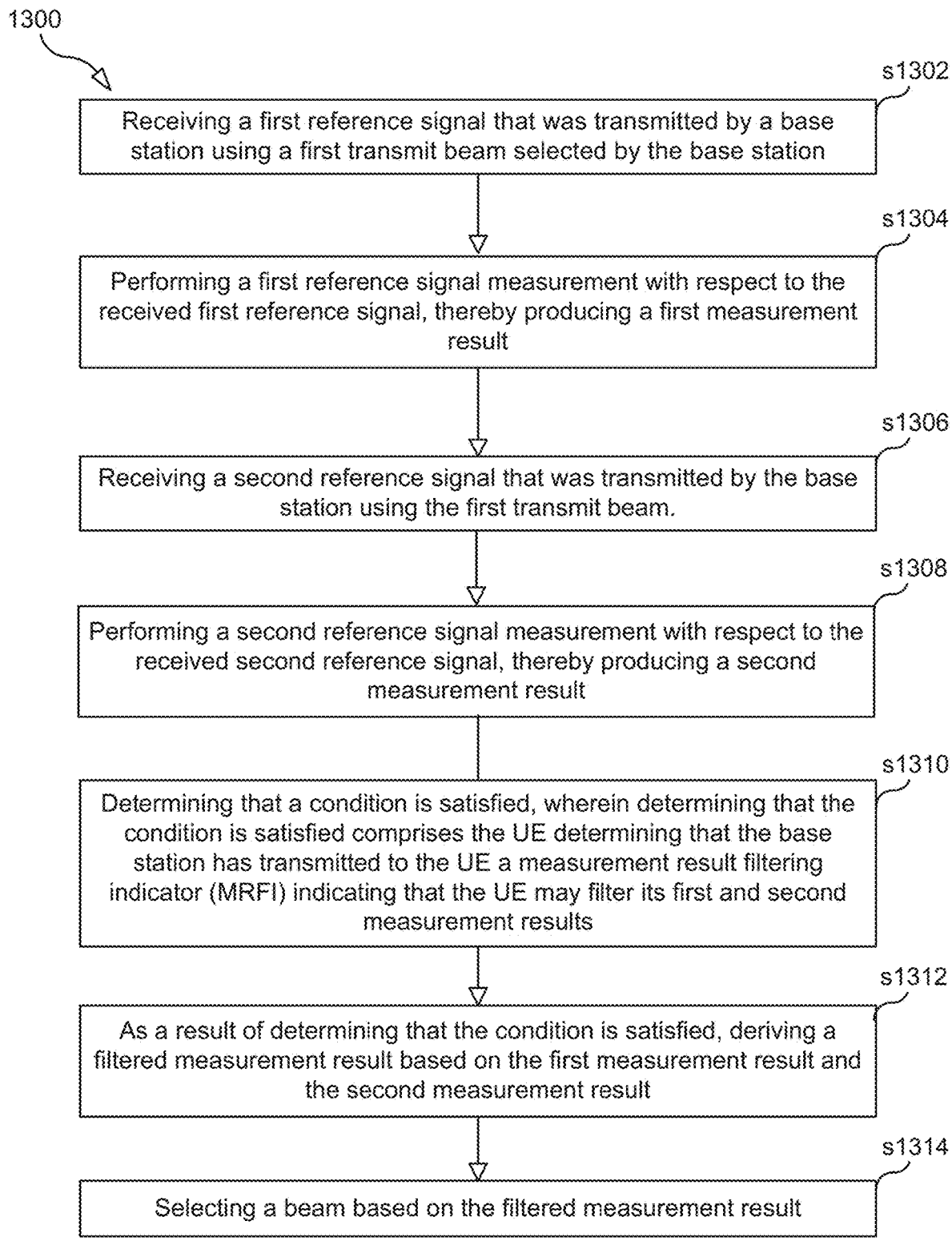
FIG. 13 is a flow chart illustrating a process according to some embodiments.

FIG. 13 is a flowchart illustrating a process 1300 for selecting a beam, as performed by UE 804. Process 1300 may begin in step s1302.

Step s1302 comprises receiving a first reference signal that was transmitted by a base station using a first transmit beam selected by the base station. For example, base station is base station 802.

Step s1304 comprises performing a first reference signal measurement (e.g., RSRP, RSRQ, or SINR measurement) with respect to the received first reference signal, thereby producing a first measurement result (e.g., RSRP, RSRQ, or SINR quantity).

Step s1306 comprises receiving a second reference signal that was transmitted by the base station using the first transmit beam.

Step s1308 comprises performing a second reference signal measurement (e.g., RSRP, RSRQ, or SINR measurement) with respect to the received second reference signal, thereby producing a second measurement result (RSRP, RSRQ, or SINR quantity).

Step s1310 comprises determining that a condition is satisfied, wherein determining that the condition is satisfied comprises the UE determining that the base station has transmitted to the UE a measurement result filtering indicator (MRFI) indicating (directly or indirectly) that the UE may filter its first and second measurement results.

Step s1312 comprises, as a result of determining that the condition is satisfied, deriving a first filtered measurement result based on the first measurement result and the second measurement result. For example, in step s1312 the UE implements the filter: $Fn1=(1-a)Fn-1+Mn$, where a is predetermined coefficient, Fn−1 is the first measurement result and Mn is the second measurement result, and Fn1 is the first filtered measurement result.

Step s1314 comprises selecting a beam based on the first filtered measurement result.

In some embodiments, determining that the condition is satisfied in step s1310 further comprises the UE determining a displacement (e.g., an angular displacement or a linear displacement) of the UE and determining that a magnitude of the displacement is less than a threshold. For example if the magnitude of the displacement is greater than a threshold, then UE 804 should not perform the measurement filtering (i.e., the condition is not satisfied).

In some embodiments, the MRFI consists of a code point identifying a trigger state information element (IE) (e.g., a CSI-AperiodicTriggerState IE) comprising an associated report configuration IE (e.g., CSI-AssociatedReportConfig-Info IE). In some embodiments, the trigger state IE or the associated report configuration IE comprises an MRFI flag that indicating that the UE may filter its first and second measurement results.

In some embodiments, the MFRI is a single bit in a DCI. In some embodiments, the MFRI is a single bit in a MAC CE.

In some embodiments of step s1310, deriving the first filtered measurement result is further based on a time filter coefficient, wherein the time filter coefficient determines a weighting of the second measurement result and a weighting of the first measurement result. For example, the time filter coefficient is determined based on a determined magnitude of a displacement (angular and/or linear) of the UE.

In some embodiments, the first reference signal is transmitted by base station 804 as part of a first P3 sweep and the second reference signal is transmitted by base station 804 as part of a second P3 sweep. In such an embodiment, the step of the UE receiving the first reference signal comprises the UE using a first UE receive (RX) beam to receive the first reference signal and the step of the UE receiving the second reference signal comprises the UE using the first UE RX beam to receive the second reference signal. In some embodiments, step s1314 comprises the UE, based on the first filtered measurement result, selecting a UE RX beam from a set of UE RX beams comprising the first UE RX beam and a second UE RX beam. In this example, the second UE RX beam was used by UE 804 to receive a third reference signal transmitted during the first P3 sweep and the second UE RX beam was used by UE 804 to receive a fourth reference signal transmitted during the second P3 sweep. Additionally, UE 804 performs the steps of: i) as part of the first P3 sweep, performing a third reference signal measurement with respect to the received third reference signal, thereby producing a third measurement result; ii) as part of the second P3 sweep, performing a fourth reference signal measurement with respect to the received fourth reference signal, thereby producing a fourth measurement result; iii) deriving a second filtered measurement result based on the third measurement result and the fourth measurement result (e.g., UE implements the filter: Fn2=(1−a)Fn−3+Mn4, where a is predetermined coefficient, Fn−3 is the third measurement result and Mn4 is the fourth measurement result, and Fn2 is the second filtered measurement result) In this embodiment, selecting a beam based on the first filtered measurement result (i.e., step s1314) comprises the UE, based on the first filtered measurement result and the second filtered measurement result, selecting a UE RX beam from a set of UE RX beams comprising the first UE RX beam and the second UE RX beam. For example, the second UE RX beam may be selected after the second filter measurement result is compared to the first filtered measurement result and determined to be greater than the first filtered measurement result.

In some embodiments, the MFRI comprises or consists of i) a filtering indicator, indicating that the UE may derive the filtered measurement or ii) a flushing indicator, indicating the UE should flush CSI resource signal memory buffers of the UE.

In some embodiments, process 1300 further comprises the UE determining that the base station has transmitted to the UE the MFRI comprising the flushing indicator, and, after determining that the base station has transmitted to the UE the MFRI comprising the flushing indicator, the UE flushing CSI resource signal memory buffers of the UE.

In some embodiments, the MFRI is a one bit field, and the flushing indicator comprises a change in the one bit field from an MFRI previously sent from the base station to the UE.

In some embodiments, step s1314 comprises selecting a UE receive beam based on the filtered measurement result.

In some embodiments, step s1314 comprises selecting a resource indicator (e.g., a CS-RS resource indicator (CRI)) based on the filtered measurement result and transmitting to the base station a beam report comprising the selected resource indicator.

In some embodiments, the first reference signal was received by the UE as part of a first P2 beam sweep and the second reference signal was received by the UE as part of a second P2 beam sweep. In such an embodiment, process 1300 may further includes the steps of: i) the UE receiving, as part of the first P2 beam sweep, a third reference signal that was transmitted by the base station using a second transmit beam selected by the base station; ii) the UE performing a third reference signal measurement with respect to the received third reference signal, thereby producing a third measurement result; iii) the UE receiving, as part of the second P2 beam sweep, a fourth reference signal that was transmitted by the base station using the second transmit beam; iv) the UE performing a fourth reference signal measurement with respect to the received fourth reference signal, thereby producing a fourth measurement result; and v) the UE deriving a second filtered measurement result based on the third measurement result and the fourth measurement result. In this embodiment, the step of the UE selecting a beam based on the first filtered measurement result comprises the UE selecting a resource indicator based on the first and second filtered measurement result. For example, the UE selects a resource indicator indicating the resources that were used to transmit the first and second reference signals (i.e., indicating the first transmit beam) as a result of the UE comparing the first filtered measurement result to the second filter measurement result and determining that the first filtered measurement is greater than (or threshold greater than) the second filtered measurement result.

Figure 14:
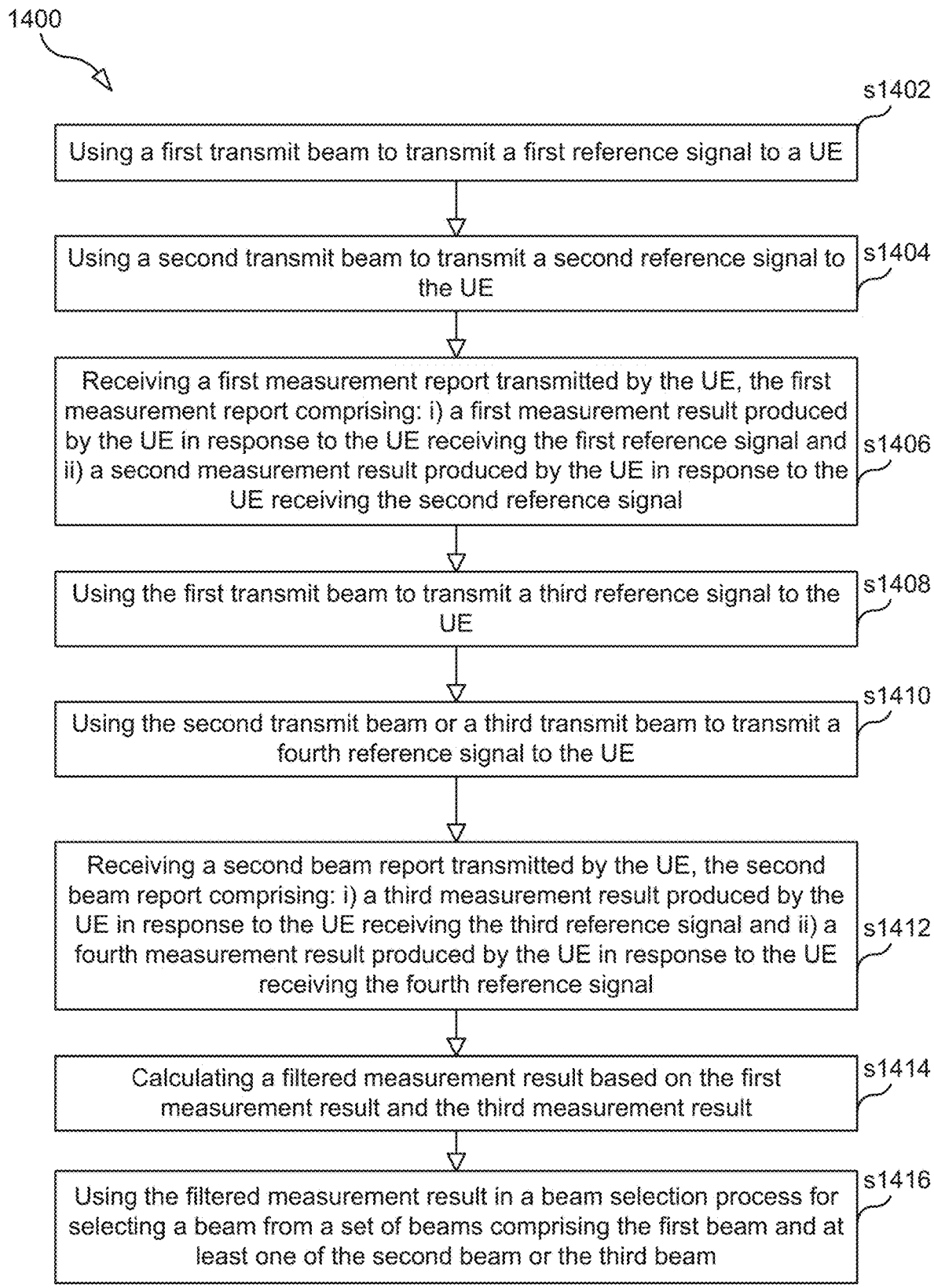
FIG. 14 is a flow chart illustrating a process according to some embodiments.

FIG. 14 is a flowchart illustrating a process 1400 for selecting a beam. Process 1400 may begin in step s1402. For example, process 1400 is performed by base station 802 regarding UE 804.

Step s1402 comprises using a first TX beam to transmit a first reference signal to a UE.

Step s1404 comprises using a second TX beam to transmit a second reference signal to the UE.

Step s1406 comprises receiving a first beam report transmitted by the UE, the first beam report comprising: i) a first measurement result produced by the UE in response to the UE receiving the first reference signal and ii) a second measurement result produced by the UE in response to the UE receiving the second reference signal.

Step s1408 comprises using the first TX beam to transmit a third reference signal to the UE.

Step s1410 comprises using the second TX beam or a third TX beam to transmit a fourth reference signal to the UE.

Step s1412 comprises receiving a second beam report transmitted by the UE. The second beam report comprises: i) a third measurement result produced by the UE in response to the UE receiving the third reference signal and ii) a fourth measurement result produced by the UE in response to the UE receiving the fourth reference signal.

Step s1414 comprises calculating a filtered measurement result based on the first measurement result and the third measurement result. For example, in step s1414 the base station implements the filter: $Fn=(1-a)Fn-1+Mn$, where a is predetermined coefficient, $Fn-1$ is the first measurement result and Mn is the third measurement result.

Step s1416 comprises using the filtered measurement result in a beam selection process for selecting a TX beam from a set of TX beams comprising the first TX beam and at least one of the second TX beam or the third TX beam.

FIG. 15 is a flowchart illustrating a process 1500 for selecting a beam. For example, process 1500 is performed by base station 802 regarding UE 804. Process 1500 may begin in step s1502.

Step s1502 comprises as part of a first beam management procedure (e.g., a first P2 sweep), using a first TX beam to transmit to a user equipment (UE) a first reference signal, thereby enabling the UE to produce a first measurement result associated with the first TX beam.

Step s1504 comprises triggering a second beam management procedure (e.g., a second P2 sweep). Triggering the second beam management procedure comprises transmitting to the UE a triggering message (e.g., DCI or MAC CE) comprising an MRFI. The MFRI indicates (directly or indirectly) that the UE may produce a filtered measurement result by filtering a second measurement result to be produced by the UE during the second beam management procedure using the first measurement result produced by the UE during the first beam management procedure. As noted above, the MRFI may point to an MRFI flag or may comprise the MRFI flag.

Step s1506 comprises, as part of the second beam management procedure, using the first TX beam to transmit to the UE a second reference signal, thereby enabling the UE to produce the second measurement result.

Step s1508 comprises as part of the second beam management procedure, receiving a beam report transmitted by the UE, the beam report comprising a resource indicator selected by the UE using the filtered measurement result. The filtered measurement result is a function of the first measurement result produced by the UE during the first beam management procedure and the second measurement result produced by the UE during the second beam management procedure.

Figure 16:
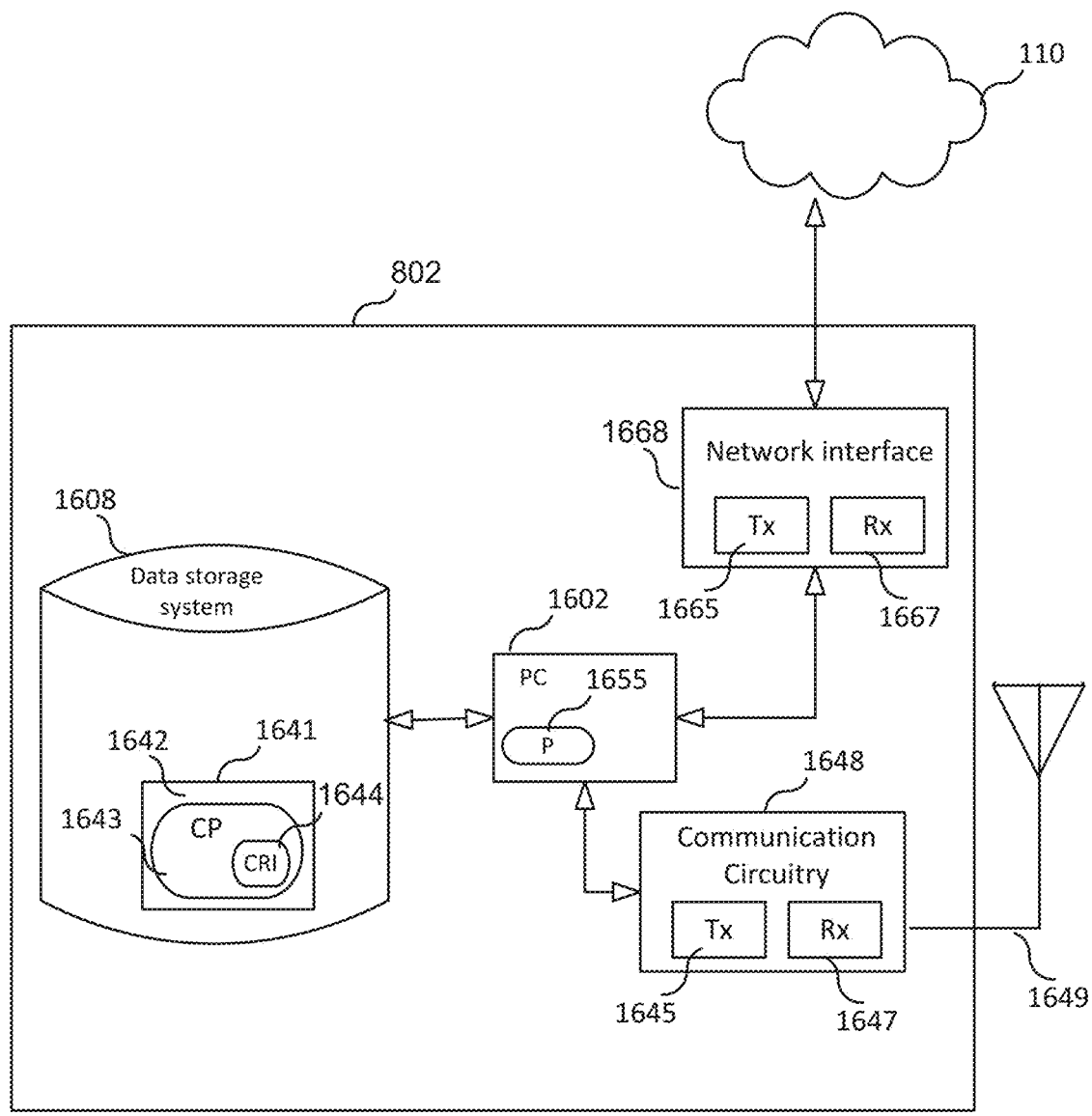
FIG. 16 is a block diagram illustrating a base station according to an embodiment.

FIG. 16 is a block diagram of base station 802, according to some embodiments. As shown in FIG. 16, base station 802 may comprise: processing circuitry (PC) 1602, which may include one or more processors (P) 1655 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., base station 802 may be a distributed computing apparatus); a network interface 1668 comprising a transmitter (Tx) 1665 and a receiver (Rx) 1667 for enabling apparatus 1600 to transmit data to and receive data from other network nodes connected to a network 1610 (e.g., an Internet Protocol (IP) network) to which network interface 1648 is connected; communication circuitry 1648, which is coupled to an antenna arrangement 1649 comprising one or more antennas and which comprises a transmitter (Tx) 1645 and a receiver (Rx) 1647 for enabling the base station to transmit data and receive data (e.g., wirelessly transmit/receive data); and a local storage unit (a.k.a., "data storage system") 1608, which may include one or more non-volatile storage devices and/or one or more volatile storage devices. In embodiments where PC 1602 includes a programmable processor, a computer program product (CPP) 1641 may be provided. CPP 1641 includes a computer readable medium (CRM) 1642 storing a computer program (CP) 1643 comprising computer readable instructions (CRI) 1644. CRM 1642 may be a non-transitory computer readable medium, such as, magnetic media (e.g., a hard disk), optical media, memory devices (e.g., random access memory, flash memory), and the like. In some embodiments, the CRI 1644 of computer program 1043 is configured such that when executed by PC 1602, the CRI causes the base station to perform steps described herein (e.g., steps described herein with reference to the flow charts). In other embodiments, the base station may be configured to perform steps described herein without the need for code. That is, for example, PC 1602 may consist merely of one or more ASICs. Hence, the features of the embodiments described herein may be implemented in hardware and/or software.

Figure 17:
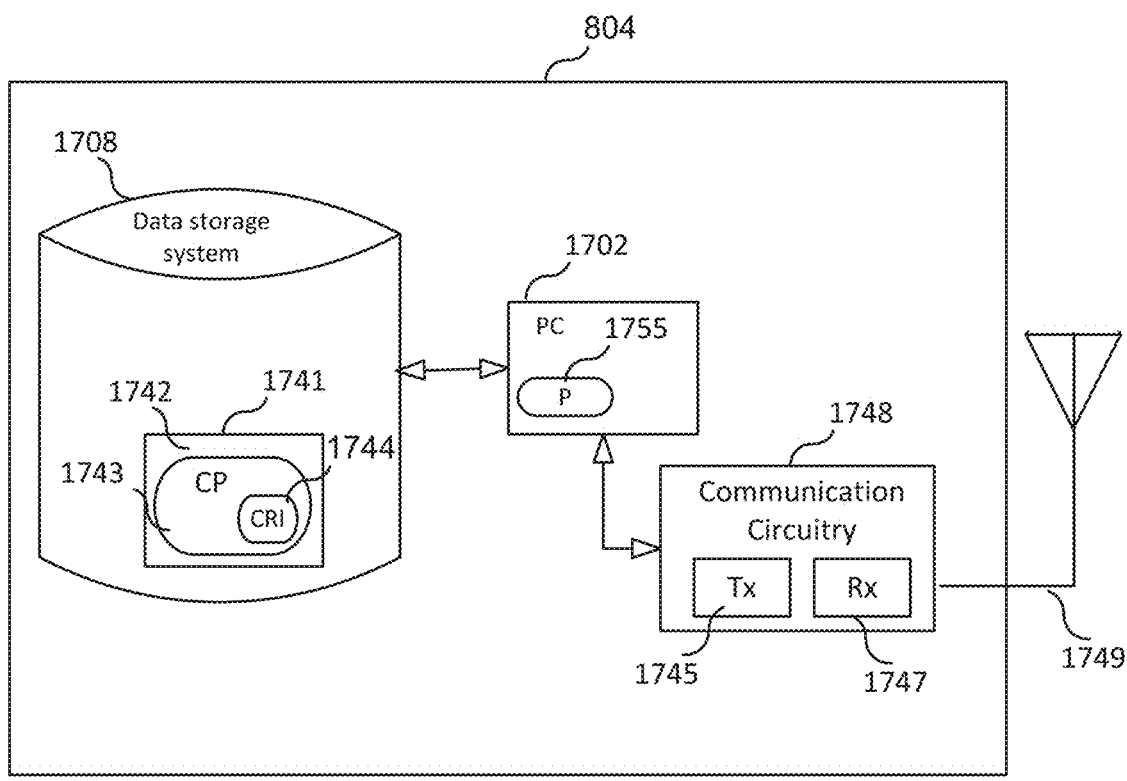
FIG. 17 is a block diagram illustrating a UE according to an embodiment.

FIG. 17 is a block diagram of UE 804, according to some embodiments. As shown in FIG. 17, UE 804 may comprise: processing circuitry (PC) 1702, which may include one or more processors (P) 1755 (e.g., one or more general purpose microprocessors and/or one or more other processors, such as an application specific integrated circuit (ASIC), field-programmable gate arrays (FPGAs), and the like); communication circuitry 1748, which is coupled to an antenna arrangement 1749 comprising one or more antennas and which comprises a transmitter (Tx) 1745 and a receiver (Rx) 1747 for enabling UE 804 to transmit data and receive data (e.g., wirelessly transmit/receive data); and a local storage unit (a.k.a., "data storage system") 1708, which may include one or more non-volatile storage devices and/or one or more volatile storage devices. In embodiments where PC 1702 includes a programmable processor, a computer program product (CPP) 1741 may be provided. CPP 1741 includes a computer readable medium (CRM) 1742 storing a computer program (CP) 1743 comprising computer readable instructions (CRI) 1744. CRM 1742 may be a non-transitory computer readable medium, such as, magnetic media (e.g., a hard disk), optical media, memory devices (e.g., random access memory, flash memory), and the like. In some embodiments, the CRI 1744 of computer program 1743 is configured such that when executed by PC 1702, the CRI causes UE 804 to perform steps described herein (e.g., steps described herein with reference to the flow charts). In other embodiments, UE 804 may be configured to perform steps described herein without the need for code. That is, for example, PC 1702 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for selecting a beam, the method comprising:
a user equipment, UE, receiving a first reference signal that was transmitted by a base station using a first transmit beam selected by the base station;
the UE performing a first reference signal measurement with respect to the received first reference signal, thereby producing a first measurement result;
the UE receiving a second reference signal that was transmitted by the base station using the first transmit beam;
the UE performing a second reference signal measurement with respect to the received second reference signal, thereby producing a second measurement result;
the UE determining that a condition is satisfied, wherein determining that the condition is satisfied comprises the UE determining that the base station has transmitted to the UE a measurement result filtering indicator (MRFI) indicating that the UE may filter its first and second measurement results;
as a result of determining that the condition is satisfied, the UE deriving a first filtered measurement result based on the first measurement result and the second measurement result; and
the UE selecting a beam based on the first filtered measurement result.

2. The method of claim 1, wherein determining that the condition is satisfied further comprises the UE determining a displacement of the UE and determining that a magnitude of the displacement is less than a threshold.

3. The method of claim 1, wherein
the MRFI consists of a code point identifying a trigger state information element (IE) comprising an associated report configuration IE, and
the trigger state IE or the associated report configuration IE comprises a flag that indicating that the UE may filter its first and second measurement results.

4. The method of claim 1, wherein the MRFI comprises at least one of: a one bit field in a downlink control information (DCI) or a one bit field in a MAC control element.

5. The method of claim 1, wherein deriving the first filtered measurement result is further based on a time filter coefficient, wherein the time filter coefficient determines a weighting of the second measurement result and a weighting of the first measurement result.

6. The method of claim 5, wherein the time filter coefficient is determined based on a determined magnitude of a displacement of the UE.

7. The method of claim 1, wherein
the UE receiving the first reference signal comprises the UE using a first UE receive (RX) beam to receive the first reference signal,
the UE receiving the second reference signal comprises the UE using the first UE RX beam to receive the second reference signal, and
the step of selecting a beam based on the first filtered measurement result comprises the UE, based on the first filtered measurement result, selecting a UE RX beam from a set of UE RX beams comprising the first UE RX beam and a second UE RX beam.

8. The method of claim 1, wherein the MRFI is a flushing indicator, indicating the UE should flush CSI resource signal memory buffers of the UE.

9. The method of claim 8, further comprising:
the UE determining that the base station has transmitted to the UE the MRFI comprising the flushing indicator;
after determining that the base station has transmitted to the UE the MRFI comprising the flushing indicator, the UE flushing CSI resource signal memory buffers of the UE.

10. The method claim of 8, wherein the MRFI is a one bit field, and wherein the flushing indicator comprises a change in the one bit field from an MRFI previously sent from the base station to the UE.

11. The method of claim 1, wherein selecting a beam based on the filtered measurement result comprises the UE selecting a resource indicator based on the filtered measurement result and transmitting to the base station a beam report comprising the selected resource indicator.

12. The method of claim 11, wherein
the first reference signal was received by the UE as part of a first P2 beam sweep,
the second reference signal was received by the UE as part of a second P2 beam sweep,
the method further comprises: i) the UE receiving, as part of the first P2 beam sweep, a third reference signal that was transmitted by the base station using a second transmit beam selected by the base station; ii) the UE performing a third reference signal measurement with respect to the received third reference signal, thereby producing a third measurement result; iii) the UE receiving, as part of the second P2 beam sweep, a fourth reference signal that was transmitted by the base station using the second transmit beam; iv) the UE performing a fourth reference signal measurement with respect to the received fourth reference signal, thereby producing a fourth measurement result; and v) the UE deriving a second filtered measurement result based on the third measurement result and the fourth measurement result, and
the step of the UE selecting a beam based on the first filtered measurement result comprises the UE selecting the resource indicator based on the first and second filtered measurement result.

13. A method for selecting a beam, the method comprising:
a base station using a first transmit beam to transmit a first reference signal to a user equipment, UE;
the base station using a second transmit beam to transmit a second reference signal to the UE;
the base station receiving a first beam report transmitted by the UE, the first beam report comprising: i) a first measurement result produced by the UE in response to the UE receiving the first reference signal and ii) a second measurement result produced by the UE in response to the UE receiving the second reference signal;
the base station using the first transmit beam to transmit a third reference signal to the UE;

the base station using the second transmit beam or a third transmit beam to transmit a fourth reference signal to the UE;

the base station receiving a second beam report transmitted by the UE, the second beam report comprising: i) a third measurement result produced by the UE in response to the UE receiving the third reference signal and ii) a fourth measurement result produced by the UE in response to the UE receiving the fourth reference signal;

the base station calculating a filtered measurement result based on the first measurement result and the third measurement result; and using the filtered measurement result in a beam selection process for selecting a beam from a set of beams comprising the first beam and at least one of the second beam or the third beam.

14. A method for selecting a beam, the method comprising:

as part of a first beam management procedure, a base station using a first transmit beam to transmit to a user equipment (UE) a first reference signal, thereby enabling the UE to produce a first measurement result associated with the first transmit beam;

the base station triggering a second beam management procedure, wherein triggering the second beam management procedure comprises the base station transmitting to the UE a triggering message comprising a measurement result filtering indicator (MRFI) indicating that the UE may produce a filtered measurement result by filtering a second measurement result to be produced by the UE during the second beam management procedure using the first measurement result produced by the UE during the first beam management procedure;

as part of the second beam management procedure, the base station using the first transmit beam to transmit to the UE a second reference signal, thereby enabling the UE to produce the second measurement result; and as part of the second beam management procedure, the base station receiving a beam report transmitted by the UE, the beam report comprising a resource indicator selected by the UE using the filtered measurement result, wherein the filtered measurement result is a function of the first measurement result produced by the UE during the first beam management procedure and the second measurement result produced by the UE during the second beam management procedure.

15. A computer program product comprising a non-transitory computer readable medium storing a computer program comprising instructions, which, when executed by processing circuitry on a user equipment (UE), causes the UE to perform the method of claim 1.

16. A computer program product comprising a non-transitory computer readable medium storing computer program comprising instructions, which, when executed by processing circuitry on a base station, causes the base station to perform the method of claim 13.

17. A computer program product comprising a non-transitory computer readable medium storing computer program comprising instructions, which, when executed by processing circuitry on a base station, causes the base station to perform the method of claim 14.

18. A user equipment, the user equipment (UE) comprising:

a local storage unit; and processing circuitry coupled to the local storage unit, wherein the UE is configured to perform the method of claim 1.

19. A base station, the base station comprising:

a local storage unit; and processing circuitry coupled to the local storage unit, wherein the base station is configured to perform the method of claim 13.

20. A base station, the base station comprising:

a local storage unit; and processing circuitry coupled to the local storage unit, wherein the base station is configured to perform the method of claim 14.

* * * * *

UNITED STATES PATENT AND TRADEMARK OFFICE
CERTIFICATE OF CORRECTION

PATENT NO. : 11,184,901 B2
APPLICATION NO. : 16/720143
DATED : November 23, 2021
INVENTOR(S) : Nilsson et al.

It is certified that error appears in the above-identified patent and that said Letters Patent is hereby corrected as shown below:

In the Specification

Column 15, Line 22, delete "MFRI" and insert -- MRFI --, therefor.

Column 15, Line 23, delete "MFRI" and insert -- MRFI --, therefor.

Column 16, Line 5, delete "MFRI" and insert -- MRFI --, therefor.

Column 16, Line 12, delete "MFRI" and insert -- MRFI --, therefor.

Column 16, Line 14, delete "MFRI" and insert -- MRFI --, therefor.

Column 16, Line 16, delete "MFRI" and insert -- MRFI --, therefor.

Column 16, Line 18, delete "MFRI" and insert -- MRFI --, therefor.

Column 17, Line 38, delete "MFRI" and insert -- MRFI --, therefor.

Signed and Sealed this
Tenth Day of May, 2022

Katherine Kelly Vidal
*Director of the United States Patent and Trademark Office*